(12) United States Patent
Nakade et al.

(10) Patent No.: US 6,775,225 B2
(45) Date of Patent: Aug. 10, 2004

(54) DISC DRIVE APPARATUS

(75) Inventors: Isamu Nakade, Kanazawa (JP);
Takanori Hayashi, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 113 days.

(21) Appl. No.: 10/103,021

(22) Filed: Mar. 21, 2002

(65) Prior Publication Data

US 2002/0136154 A1 Sep. 26, 2002

(30) Foreign Application Priority Data

Mar. 22, 2001 (JP) ........................................ 2001-083902

(51) Int. Cl.$^7$ ........................ G11B 17/028; G11B 23/00
(52) U.S. Cl. ..................................................... 369/271
(58) Field of Search .............................. 369/271, 270; 360/99.12

(56) References Cited

U.S. PATENT DOCUMENTS

| | | | | |
|---|---|---|---|---|
| 5,056,082 A | * | 10/1991 | Ekhoff | 369/270 |
| 6,208,613 B1 | * | 3/2001 | Iizuka | 369/271 |
| 6,272,104 B1 | * | 8/2001 | Liao et al. | 369/270 |
| 6,614,748 B2 | * | 9/2003 | Shiomi et al. | 369/270 |

FOREIGN PATENT DOCUMENTS

| | | | |
|---|---|---|---|
| EP | 0 813 199 A | 12/1997 | |
| EP | 0 867 876 A | 9/1998 | |

* cited by examiner

*Primary Examiner*—Angel Castro
(74) *Attorney, Agent, or Firm*—Pearne & Gordon LLP

(57) ABSTRACT

Herein disclosed is a disc drive apparatus for driving an optical disc having a central portion formed with a central hole, comprising: a frame member, a disc retaining member rotatably supported by the frame member, a cam member supported by the disc retaining member and rockable with respect to the disc retaining member, a plurality of disc holding members each supported by the disc retaining member and operatively coupled with the cam member, each of the disc holding members being movable with respect to the disc retaining member to assume two different operation positions including a disc holding position in which each of the disc holding members is held in contact with the central portion of the optical disc, and a disc releasing position in which each of the disc holding members is held out of contact with the central portion of the optical disc, and a resilient member intervening between the disc retaining member and each of the disc holding members to have each of the disc holding members resiliently urged to assume the disc holding position.

33 Claims, 16 Drawing Sheets

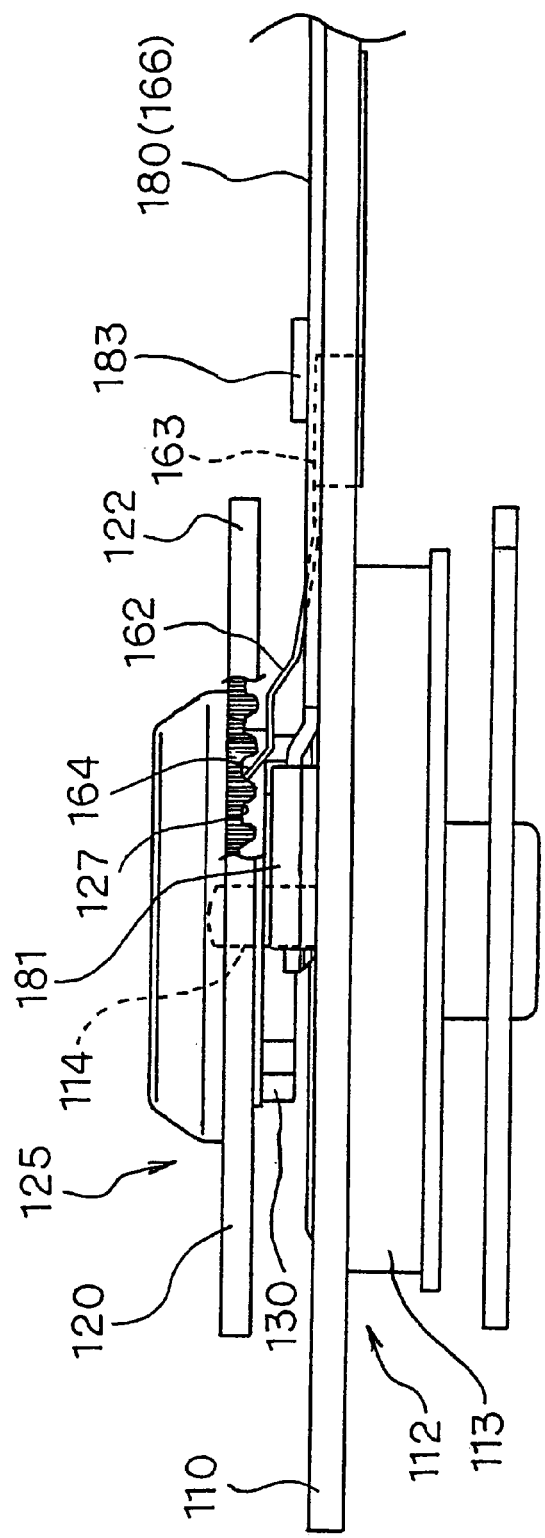

200

DISC DRIVE APPARATUS

BACKGROUND OF THE INVENTION

1. Field of the Invention

The present invention relates to a disc drive apparatus for driving an optical disc, and more particularly to a disc drive apparatus equipped with a disc holding mechanism for detachably holding the optical disc thereon.

2. Description of the Related Art

Up until now, there have been proposed a wide variety of conventional disc drive apparatuses each designed to drive an optical disc, such as a compact disc (CD) and a digital versatile disc (DVD), having a central portion formed with a circular hole. The conventional disc drive apparatuses of this kind have so far been available for various information recording and/or reproducing apparatuses. The conventional disc drive apparatuses thus proposed are disclosed in the Japanese Patent Laid-Open Publication No. 10-134462 and the Japanese Patent Laid-Open Publication No. 10-269722.

One typical example of the conventional disc drive apparatuses is raised as a forcible mount type of conventional disc drive apparatus. The conventional disc drive apparatus of this type comprises a disc retaining member formed with a peripheral ledge, a plurality of disc holding members each movably supported by the disc retaining member, and a plurality of spring members each intervening between the disc retaining member and each of the disc holding members to have each of the disc holding members resiliently urged radially outwardly of the disc retaining member. The disc retaining member, the disc holding members and the spring members are collectively constitute a disc holding mechanism for detachably holding the optical disc thereon.

In the conventional disc drive apparatus thus constructed, the optical disc is mounted on the disc retaining member under the state that the central portion of the optical disc is received in the peripheral ledge of the disc retaining member with each of the disc holding members being resiliently urged by each of the spring members radially outwardly of the disc retaining member to have each of the disc holding members held in contact with the central portion of the optical disc to hold the optical disc to the disc retaining member. In this example, the optical disc is forcibly mounted on and dismounted from the disc retaining member against the resilient force of each of the spring members.

Another typical example of the conventional disc drive apparatuses is raised as a mechanical mount type of conventional disc drive apparatus and shown in FIGS. 13 to 16. The conventional disc drive apparatus 900 of this type comprises a frame member 910, a disc retaining member 920 supported by the frame member 910 and rotatable around its rotation axis, a cam member 930 rockably supported by the disc retaining member 920, a plurality of disc holding members 940 each supported by the disc retaining member 920 and operatively coupled with the cam member 930, and a plurality of spring members 950 each intervening between the disc retaining member 920 and each of the disc holding members 940 to have each of the disc holding members 940 resiliently urged radially outwardly of the disc retaining member 920.

The disc retaining member 920 is formed with a peripheral ledge 921 and operative to assume two different operation states including a disc retaining state in which the optical disc, not shown, is mounted on the disc retaining member 920 under the state that the central portion of the optical disc is received in the peripheral ledge 921 of the disc retaining member 920, and a non-retaining state in which the optical disc is dismounted from the disc retaining member 920.

The cam member 930 is rockable with respect to the disc retaining member 920 to assume two different operation positions including a first rocking position shown in FIGS. 16A and 16B, and a second rocking position shown in FIGS. 14A and 14B. The cam member 930 is formed with a plurality of grooves 931 each having opposing side surfaces 931a and 931b opposing and spaced apart from each other at a constant space distance.

Each of the disc holding members 940 has a holding end 941 and is movable with respect to the disc retaining member 920 to assume two different operation positions including a disc holding position in which the holding end 941 of each of the disc holding members 940 is held in contact with the central portion of the optical disc to hold the optical disc to the disc retaining member 920 under the state that the cam member 930 is rocked to assume the first rocking position as shown in FIGS. 16A and 16B, and a disc releasing position in which the holding end 941 of each of the disc holding members 940 is held out of contact with the central portion of the optical disc to release the optical disc from the disc retaining member 920 under the state that the cam member 930 is rocked to assume the second rocking position as shown in FIGS. 14A and 14B.

Each of the disc holding members 940 has a projection 942 received in each of the grooves 931 of the cam member 930 and slidably movable along the opposing side surfaces 931a and 931b of each of the grooves 931 of the cam member 930 to have each of the disc holding members 940 moved between the disc holding position and the disc releasing position. The opposing side surfaces 931a and 931b of each of the grooves 931 of the cam member 930 are spaced apart from each other at the constant space distance approximately equal to the diameter of the projection 942 of each of the disc holding members 940.

Each of the spring members 950 intervenes between the disc retaining member 920 and each of the disc holding members 940 to have each of the disc holding members 940 resiliently urged to assume the disc holding position as shown in FIGS. 16A and 16B.

The disc retaining member 920, the cam member 930, the disc holding members 940 and the spring members 950 are collectively constitute a disc holding mechanism 960 designed to detachably hold the optical disc thereon.

The conventional disc drive apparatus 900 further comprises a cam rocking member 970 movably supported by the frame member 910, an optical pickup unit 980 for recording information to and reproducing information from the optical disc, and a changeover lever 990 operatively connected to the cam rocking member 970.

The cam rocking member 970 is movable with respect to the frame member 910 to assume two different operation positions including an engaging position in which the cam rocking member 970 is held in engagement with the cam member 930 to have the cam member 930 rocked to assume the second rocking position as shown in FIGS. 13A and 13B, and a disengaging position in which the cam rocking member 970 is held out of engagement with the cam member 930 to have the cam member 930 rocked to assume the first rocking position as shown in FIGS. 15A and 15B.

The optical pickup unit 980 is supported by the frame member 910 and movable toward and away from the rotation axis of the disc retaining member 920. The optical pickup unit 980 includes a pushing end 981 and a protrusion 982 and is operative to assume three different operation states including a cam releasing state in which the optical pickup unit 980 is moved toward the rotation axis of the disc retaining member 920 with the pushing end 981 of the optical pickup unit 980 being held in contact with the cam rocking member 970 to have the cam rocking member 970 moved to assume the disengaging position as shown in FIGS. 15A and 15B, a cam holding state in which the optical pickup unit 980 is moved away from the rotation axis of the disc retaining member 920 with the protrusion 982 of the optical pickup unit 980 being held in contact with the changeover lever 990 to have the cam rocking member 970 moved to assume the engaging position through the changeover lever 990 as shown in FIGS. 13A and 13B, and a recording and reproducing state in which the optical pickup unit 980 is movable toward and away from the rotation axis of the disc retaining member 920 to record information to and reproduce information from the optical disc.

The changeover lever 990 is movable with respect to the optical pickup unit 980 to assume two different operation positions including a protruding position in which the changeover lever 990 is located on the path of the protrusion 982 of the optical pickup unit 980 to have the optical pickup unit 980 operated to assume the cam holding state as shown in FIGS. 13A and 13B, and a retracting position in which the changeover lever 990 is located out of the path of the protrusion 982 of the optical pickup unit 980 to have the optical pickup unit 980 operated to assume the recording and reproducing state as shown in FIGS. 15A and 15B.

The operation of the conventional disc drive apparatus 900 will be described hereinafter with reference to the drawings shown in FIGS. 13 to 16.

The following description will be described to the case that the optical disc is mounted on the disc retaining member 920. In this case, the disc retaining member 920 is operated to assume the non-retaining state with each of the disc holding members 940 being moved to assume the disc releasing position before the optical disc is mounted on the disc retaining member 920.

The disc retaining member 920 is held in the non-retaining state in which the optical disc is dismounted from the disc retaining member 920 as shown in FIGS. 13A and 13B until the optical disc is mounted on the disc retaining member 920.

When the optical disc, not shown, is mounted on the disc retaining member 920 with the disc retaining member 920 being operated to assume the disc retaining state, the optical pickup unit 980 is operated to assume the cam releasing state in which the optical pickup unit 980 is moved in a direction shown by an arrow 901a with the pushing end 981 of the optical pickup unit 980 being held in contact with the cam rocking member 970 as shown in FIGS. 15A and 15B.

When the optical pickup unit 980 is operated to assume the cam releasing state, the cam rocking member 970 is moved by the optical pickup unit 980 in the direction shown by the arrow 901a to assume the disengaging position in which the cam rocking member 970 is held out of engagement with the cam member 930 as shown in FIGS. 15A and 15B.

When the cam rocking member 970 is moved by the optical pickup unit 980 to assume the disengaging position, the cam member 930 is rocked by the cam rocking member 970 in a direction shown by an arrow 902a to assume the first rocking position as shown in FIGS. 16A and 16B.

When the cam member 930 is rocked by the cam rocking member 970 to assume the first rocking position, each of the disc holding members 940 is moved by the cam member 930 to assume the disc holding position in which the holding end 941 of each of the disc holding members 940 is held in contact with the central portion of the optical disc to hold the optical disc to the disc retaining member 920 as shown in FIGS. 16A and 16B.

When each of the disc holding members 940 is moved by the cam member 930 to assume the disc holding position, the optical pickup unit 980 is operated to assume the recording and reproducing state in which the optical pickup unit 980 is movable toward and away from the rotation axis of the disc retaining member 920 to record information to and reproduce information from the optical disc.

When the optical pickup unit 980 is operated to assume the recording and reproducing state, the changeover lever 990 is moved to assume the retracting position in which the changeover lever 990 is located out of the path of the protrusion 982 of the optical pickup unit 980 as shown in FIGS. 15A and 15B.

The following description will be described to the case that the optical disc is dismounted from the disc retaining member 920. In this case, the disc retaining member 920 is operated to assume the disc retaining state with each of the disc holding members 940 being moved to assume the disc holding position before the optical disc is dismounted from the disc retaining member 920.

The disc retaining member 920 is held in the disc retaining state in which the optical disc, not shown, is mounted on the disc retaining member 920 as shown in FIGS. 15A and 15B until the optical pickup unit 980 is operated to finish the recording and reproducing state.

When the optical pickup unit 980 is operated to finish the recording and reproducing state, the changeover lever 990 is moved to assume the protruding position in which the changeover lever 990 is located on the path of the protrusion 982 of the optical pickup unit 980 as shown in FIGS. 13A and 13B.

When the changeover lever 990 is moved to assume the protruding position, the optical pickup unit 980 is operated to assume the cam holding state in which the optical pickup unit 980 is moved in a direction shown by an arrow 901b with the protrusion 982 of the optical pickup unit 980 being held in contact with the changeover lever 990 as shown in FIGS. 13A and 13B.

When the optical pickup unit 980 is operated to assume the cam holding state, the cam rocking member 970 is moved by the optical pickup unit 980 in the direction shown by the arrow 901b to assume the engaging position in which the cam rocking member 970 is held in engagement with the cam member 930 as shown in FIGS. 13A and 13B.

When the cam rocking member 970 is moved by the optical pickup unit 980 to assume the engaging position, the cam member 930 is rocked by the cam rocking member 970 in a direction shown by an arrow 902b to assume the second rocking position as shown in FIGS. 14A and 14B.

When the cam member 930 is rocked by the cam rocking member 970 to assume the second rocking position, each of the disc holding members 940 is moved by the cam member 930 to assume the disc releasing position in which the holding end 941 of each of the disc holding members 940 is held out of contact with the central portion of the optical disc to release the optical disc from the disc retaining member 920 as shown in FIGS. 14A and 14B.

When each of the disc holding members 940 is moved by the cam member 930 to assume the disc releasing position, the optical disc is dismounted from the disc retaining member 920 with the disc retaining member 920 being operated to assume the non-retaining state as shown in FIGS. 13A and 13B.

The disc retaining member 920 is then held in the non-retaining state until the optical disc is mounted on the disc retaining member 920.

The conventional disc drive apparatus described in the above, however, encounters various problems as follows.

1) The conventional disc drive apparatus is increased in number of the constitution parts and thus complicated in construction, resulting from the fact that the conventional disc drive apparatus is required to comprise a plurality of spring members corresponding to the plurality of disc holding members to have each of the spring members intervene between the disc retaining member and each of the disc holding members. This means that the conventional disc drive apparatus is expensive in production cost.

2) The fact that the opposing side surfaces of each of the grooves of the cam member are spaced apart from each other at a constant space distance leads to the fact that one of the disc holding members is brought into contact with the central portion of the optical disc before the others of the disc holding members are brought into contact with the central portion of the optical disc. This means that the cam member cannot be entirely rocked to assume the first rocking position to have each of the disc holding members held in contact with the central portion of the optical disc. The conventional disc drive apparatus, therefore, cannot be operated to have the optical disc mounted thereon with a sufficient holding force to hold the optical disc.

3) The optical pickup unit is decreased in thrust force, resulting from the fact that the optical pickup unit is operated to drive the cam rocking member to be moved between the engaging position and the disengaging position. The conventional disc drive apparatus, therefore, cannot be operated to drive the optical pickup unit with a sufficient transport speed to record information to and reproduced information from the optical disc.

SUMMARY OF THE INVENTION

It is, therefore, an object of the present invention to provide a disc drive apparatus which can be reduced in number of the constitution parts and thus simple in construction.

It is another object of the present invention to provide a disc drive apparatus which can be inexpensive in production cost.

It is further object of the present invention to provide a disc drive apparatus which can be operated to have the optical disc mounted thereon with a sufficient holding force to hold the optical disc.

It is a still further object of the present invention to provide a disc drive apparatus which can be operated to drive the optical pickup unit with a sufficient transport speed to record information to and reproduced information from the optical disc.

In accordance with a first aspect of the present invention, there is provided a disc drive apparatus for driving an optical disc having a central portion formed with a central hole, comprising: a frame member, a disc retaining member rotatably supported by the frame member, a cam member supported by the disc retaining member and rockable with respect to the disc retaining member to assume two different operation positions including first and second rocking positions, a plurality of disc holding members each supported by the disc retaining member and operatively coupled with the cam member, each of the disc holding members being movable with respect to the disc retaining member to assume two different operation positions including a disc holding position in which each of the disc holding members is held in contact with the central portion of the optical disc under the state that the cam member is rocked to assume the first rocking position, and a disc releasing position in which each of the disc holding members is held out of contact with the central portion of the optical disc under the state that the cam member is rocked to assume the second rocking position, and a resilient member intervening between the disc retaining member and each of the disc holding members to have each of the disc holding members resiliently urged to assume the disc holding position.

The cam member may be formed with a plurality of grooves each having first and second groove portions, the second groove portion of each of the grooves of the cam member being larger in space distance than the first groove portion of each of the grooves of the cam member, and each of the disc holding members may have a projection slidably movably received in each of the grooves of the cam member to assume two different operation positions including a first groove position in which the projection of each of the disc holding members is located in the first groove portion of each of the grooves of the cam member under the state that each of the disc holding members is moved to assume the disc releasing position, and a second groove position in which the projection of each of the disc holding members is located in the second groove portion of each of the grooves of the cam member under the state that each of the disc holding members is moved to assume the disc holding position.

The disc drive apparatus may further comprises an optical pickup unit movably supported by the frame member, pickup driving means for driving the optical pickup unit, a cam rocking member supported by the frame member and movable with respect to the frame member to assume two different operation positions including an engaging position in which the cam rocking member is held in engagement with the cam member to have the cam member rocked to assume the second rocking position, and a disengaging position in which the cam rocking member is held out of engagement with the cam member to have the cam member rocked to assume the first rocking position, and a changeover mechanism intervening between the pickup driving means and the cam rocking member and operative to assume two different operation states including a connecting state in which the pickup driving means is operatively connected to the cam rocking member through the changeover mechanism to have the cam rocking member moved between the engaging position and the disengaging position, and a disconnecting state in which the pickup driving means is disconnected from the cam rocking member.

The disc drive apparatus may further comprises a cam rocking member supported by the frame member and movable with respect to the frame member to assume two different operation positions including an engaging position in which the cam rocking member is held in engagement with the cam member to have the cam member rocked to assume the second rocking position, and a disengaging position in which the cam rocking member is held out of engagement with the cam member to have the cam member rocked to assume the first rocking position, a driving lever supported by the frame member and operatively connected to the cam rocking member, the driving lever being movable with respect to the frame member to assume two different operation positions including a first driving position in which the driving lever is operative to drive the cam rocking member to be moved to assume the engaging position, and a second driving position in which the driving lever is operative to drive the cam rocking member to be moved to assume the disengaging position, and lever urging means for urging the driving lever to assume the second driving position.

The disc drive apparatus may be available for a video recorder for recording information to an optical disc driven by the disc drive apparatus.

In accordance with a second aspect of the present invention, there is provided a disc drive apparatus for driving an optical disc having a central portion formed with a central hole, comprising: a frame member, a disc retaining member supported by the frame member and rotatable around its rotation axis, the disc retaining member having a shaft portion in the form of a cylindrical shape, and a retaining portion integrally formed with the shaft portion of the disc retaining member and radially outwardly extending from the shaft portion of the disc retaining member, a cam member having a rock axis held in coaxial relationship with the rotation axis of the disc retaining member, the cam member being supported by the disc retaining member and rockable around the rock axis of the cam member to assume two different operation positions including first and second rocking positions, the cam member being formed with a plurality of grooves each having a first groove portion close to the rock axis of the cam member, and a second groove portion remote from the rock axis of the cam member, a plurality of disc holding members each supported by the disc retaining member and operatively coupled with the cam member, each of the disc holding members having a holding end and being movable with respect to the disc retaining member to assume two different operation positions including a disc holding position in which the holding end of each of the disc holding members is held in contact with the central portion of the optical disc under the state that the cam member is rocked to assume the first rocking position, and a disc releasing position in which the holding end of each of the disc holding members is held out of contact with the central portion of the optical disc under the state that the cam member is rocked to assume the second rocking position, each of the disc holding members having a projection slidably movably received in each of the grooves of the cam member to assume two different operation positions including a first groove position in which the projection of each of the disc holding members is located in the first groove portion of each of the grooves of the cam member under the state that each of the disc holding members is moved to assume the disc releasing position, and a second groove position in which the projection of each of the disc holding members is located in the second groove portion of each of the grooves of the cam member under the state that each of the disc holding members is moved to assume the disc holding position, and a resilient member intervening between the disc retaining member and each of the disc holding members to have each of the disc holding members resiliently urged to assume the disc holding position.

Each of the grooves of the cam member may have opposing side surfaces each held in parallel relationship with the rock axis of the cam member, each of the grooves of the cam member having a center plane located between the opposing side surfaces of each of the grooves of the cam member in equidistantly spaced relationship with the opposing side surfaces of each of the grooves of the cam member, and a perpendicular line held in perpendicular relationship to the center plane of each of the grooves of the cam member, the opposing side surfaces of each of the grooves of the cam member opposing and spaced apart along the perpendicular line of each of the grooves of the cam member from each other at a predetermined space distance.

The second groove portion of each of the grooves of the cam member may be larger in space distance than the first groove portion of each of the grooves of the cam member.

The disc drive apparatus may further comprises an optical pickup unit having a moving line held in perpendicular relationship to the rotation axis of the disc retaining member, the optical pickup unit being supported by the frame member and movable toward and away from the rotation axis of the disc retaining member along the moving line of the optical pickup unit, a pickup driving motor for driving the optical pickup unit to be movable toward and away from the rotation axis of the disc retaining member along the moving line of the optical pickup unit, a cam rocking member supported by the frame member and movable with respect to the frame member to assume two different operation positions including an engaging position in which the cam rocking member is held in engagement with the cam member to have the cam member rocked to assume the second rocking position, and a disengaging position in which the cam rocking member is held out of engagement with the cam member to have the cam member rocked to assume the first rocking position, and a changeover mechanism intervening between the pickup driving motor and the cam rocking member and operative to assume two different operation states including a connecting state in which the pickup driving motor is operatively connected to the cam rocking member through the changeover mechanism to have the cam rocking member moved between the engaging position and the disengaging position, and a disconnecting state in which the pickup driving motor is disconnected from the cam rocking member.

The disc drive apparatus may further comprises a cam rocking member supported by the frame member and movable with respect to the frame member to assume two different operation positions including an engaging position in which the cam rocking member is held in engagement with the cam member to have the cam member rocked to assume the second rocking position, and a disengaging position in which the cam rocking member is held out of engagement with the cam member to have the cam member rocked to assume the first rocking position, a driving lever supported by the frame member and operatively connected to the cam rocking member, the driving lever being movable with respect to the frame member to assume two different operation positions including a first driving position in which the driving lever is operative to drive the cam rocking member to be moved to assume the engaging position, and a second driving position in which the driving lever is operative to drive the cam rocking member to be moved to assume disengaging position, and a lever urging member intervening between the frame member and the driving lever to have the driving lever resiliently urged to assume the second driving position.

BRIEF DESCRIPTION OF THE DRAWINGS

The features and advantages of a disc drive apparatus according to the present invention will be more clearly understood from the following description taken in conjunction with the accompanying drawings in which:

FIG. 5 is an enlarged fragmentary side view taken along the lines A—A of FIG. 1;

DESCRIPTION OF THE PREFERRED EMBODIMENTS

Figure 1:
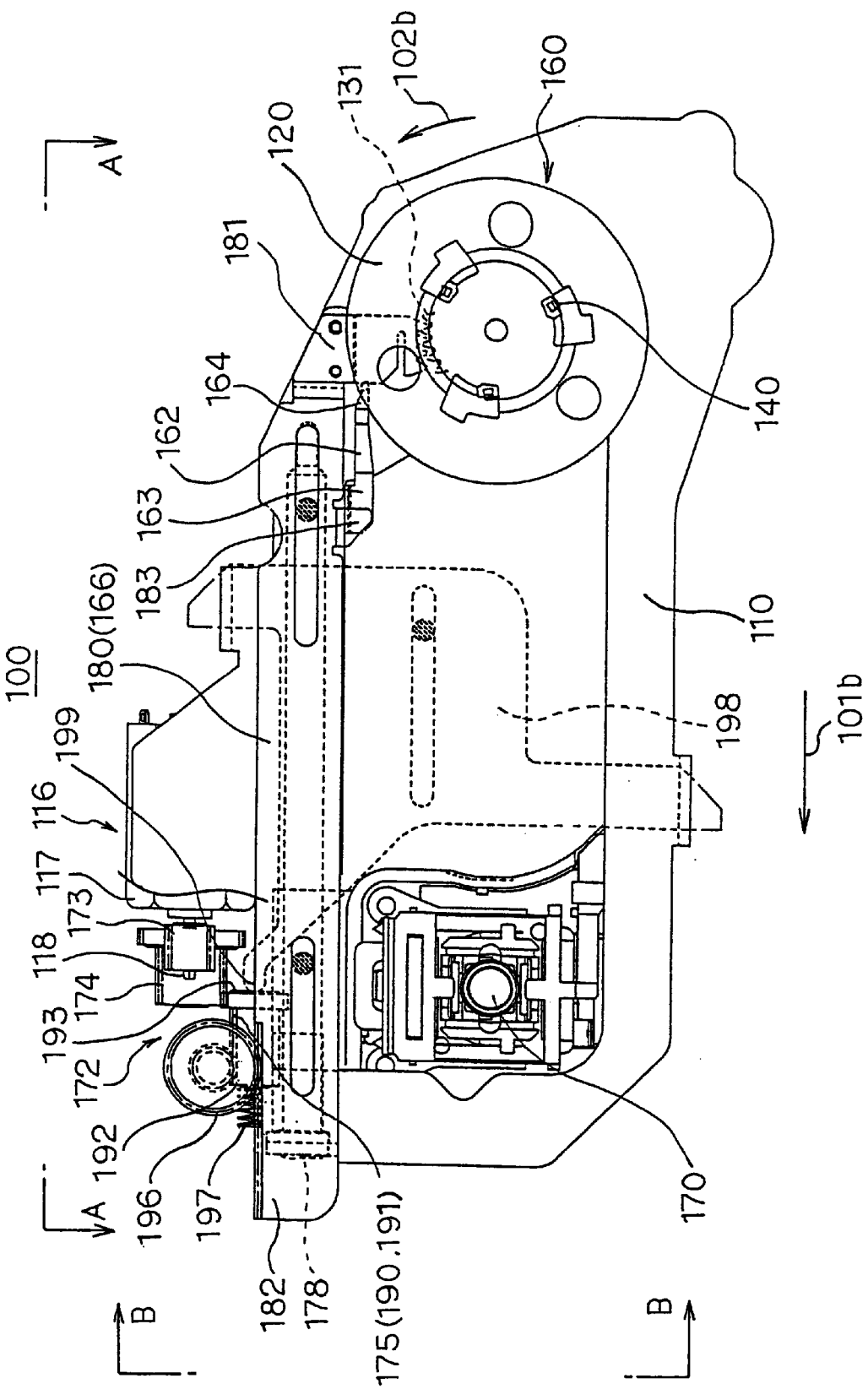
FIG. 1 is a plan view showing a first embodiment of the disc drive apparatus according to the present invention and showing an operation state in which an optical disc is dismounted from a disc retaining member forming part of the disc drive apparatus according to the present invention.

A first preferred embodiment of the disc drive apparatus according to the present invention will now be described in detail in accordance with the accompanying drawings.

Referring now to the drawings, in particular to FIGS. 1 to 8, there is shown the first preferred embodiment of the disc drive apparatus according to the present invention. The disc drive apparatus 100 is designed to drive an optical disc having a central portion formed with a central hole. The optical disc is rotatable around its rotation axis passing through the central hole of the optical disc.

In FIGS. 1 to 4, the disc drive apparatus 100 comprises a frame member 110, and a disc retaining member 120 supported by the frame member 110 and rotatable around its rotation axis.

The disc retaining member 120 has a shaft portion 121 in the form of a cylindrical shape, and a retaining portion 122 integrally formed with the shaft portion 121 of the disc retaining member 120 and radially outwardly extending from the shaft portion 121 of the disc retaining member 120. The retaining portion 122 of the disc retaining member 120 has first and second surfaces 122a and 122b each held in perpendicular relationship to the rotation axis of the disc retaining member 120. The second surface 122b of the disc retaining member 120 is held in opposing and spaced relationship with the frame member 110.

The retaining portion 122 of the disc retaining member 120 is formed at the second surface 122b of the disc retaining member 120 with a central cavity 123. The central cavity 123 of the disc retaining member 120 has a cavity surface 123a held in perpendicular relationship to the rotation axis of the disc retaining member 120, and an inner surface 123b connected at one end to the cavity surface 123a of the disc retaining member 120 and at the other end to the second surface 122b of the disc retaining member 120. The shaft portion 121 of the disc retaining member 120 projects from the cavity surface 123a of the disc retaining member 120 toward the frame member 110.

The retaining portion 122 of the disc retaining member 120 has a plurality of projections 124 each projecting from the cavity surface 123a of the disc retaining member 120 toward the frame member 110. Each of the projections 124 of the disc retaining member 120 is in the form of a cylindrical shape and having a center axis held in parallel relationship with the rotation axis of the disc retaining member 120. The projections 124 of the disc retaining member 120 are disposed around the rotation axis of the disc retaining member 120 in equiangularly spaced relationship with each other.

The retaining portion 122 of the disc retaining member 120 is formed at the first surface 122a of the disc retaining member 120 with a peripheral ledge 125. The peripheral ledge 125 of the disc retaining member 120 has a ledge surface 125a held in perpendicular relationship to the rotation axis of the disc retaining member 120, and an outer surface 125b connected at one end to the ledge surface 125a of the disc retaining member 120 and at the other end to the first surface 122a of the disc retaining member 120.

The retaining portion 122 of the disc retaining member 120 is formed with a plurality of openings 126 each open at the inner and outer surfaces 123b and 125b of the disc retaining member 120. The openings 126 of the disc retaining member 120 are disposed around the rotation axis of the disc retaining member 120 in equiangularly spaced relationship with each other.

The retaining portion 122 of the disc retaining member 120 is formed at the second surface 122b of the disc retaining member 120 with a plurality of recesses 127 each extending radially outwardly of the disc retaining member 120 as will be seen particularly from FIG. 5.

The disc retaining member 120 is operative to assume two different operation states including a disc retaining state in which the optical disc is mounted on the disc retaining member 120 under the state that the central portion of the optical disc is received in the peripheral ledge 125 of the disc retaining member 120 with the rotation axis of the optical disc being held in coaxial relationship with the rotation axis of the disc retaining member 120, and a non-retaining state in which the optical disc is dismounted from the disc retaining member 120.

The disc drive apparatus 100 further comprises a cam member 130 having a rock axis held in coaxial relationship with the rotation axis of the disc retaining member 120, a disc detecting unit, not shown, designed to detect the optical disc under the state that the disc retaining member 120 is operated to assume the disc retaining state, and a disc driving motor 112 designed to drive the disc retaining member 120 to be rotatable around the rotation axis of the disc retaining member 120.

Figure 2A:
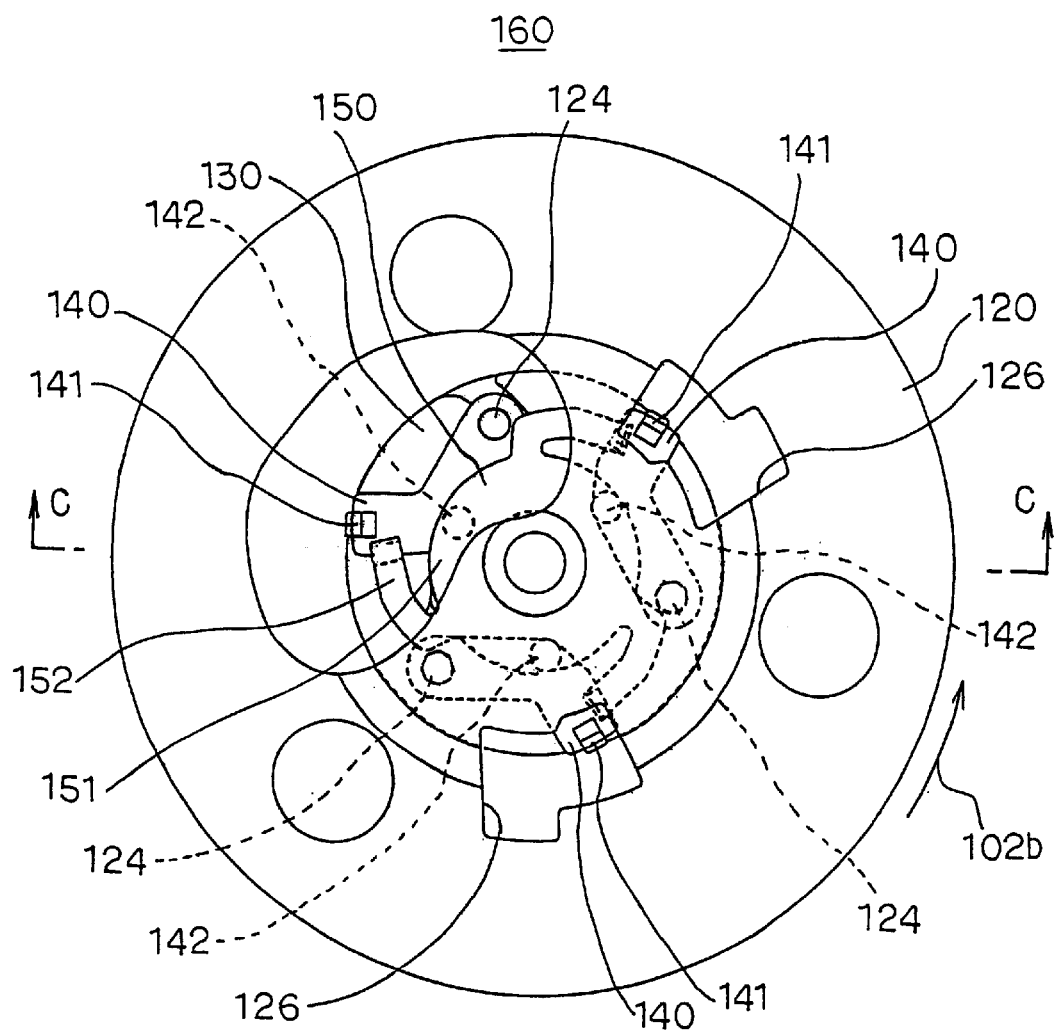
FIG. 2A is a fragmentary plan view showing a disc holding mechanism forming part of the disc drive apparatus shown in FIG. 1.
Figure 2B:
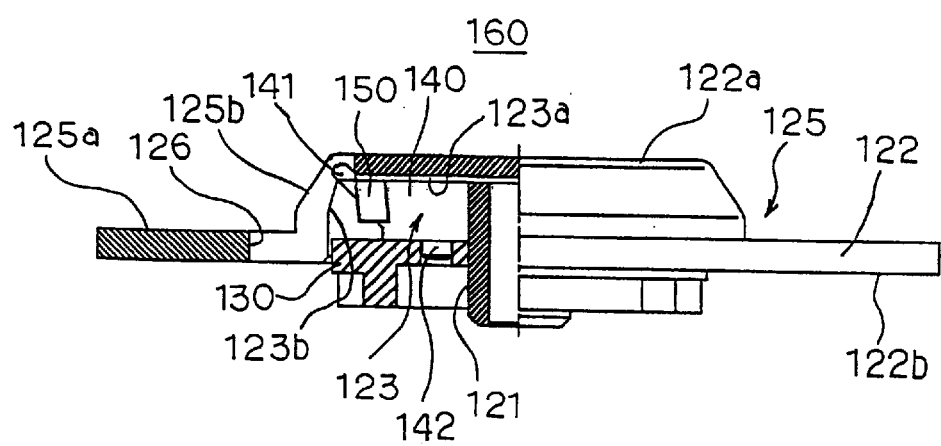
FIG. 2B is a fragmentary cross-sectional view taken along the lines C—C of FIG. 2A.
Figure 4A:
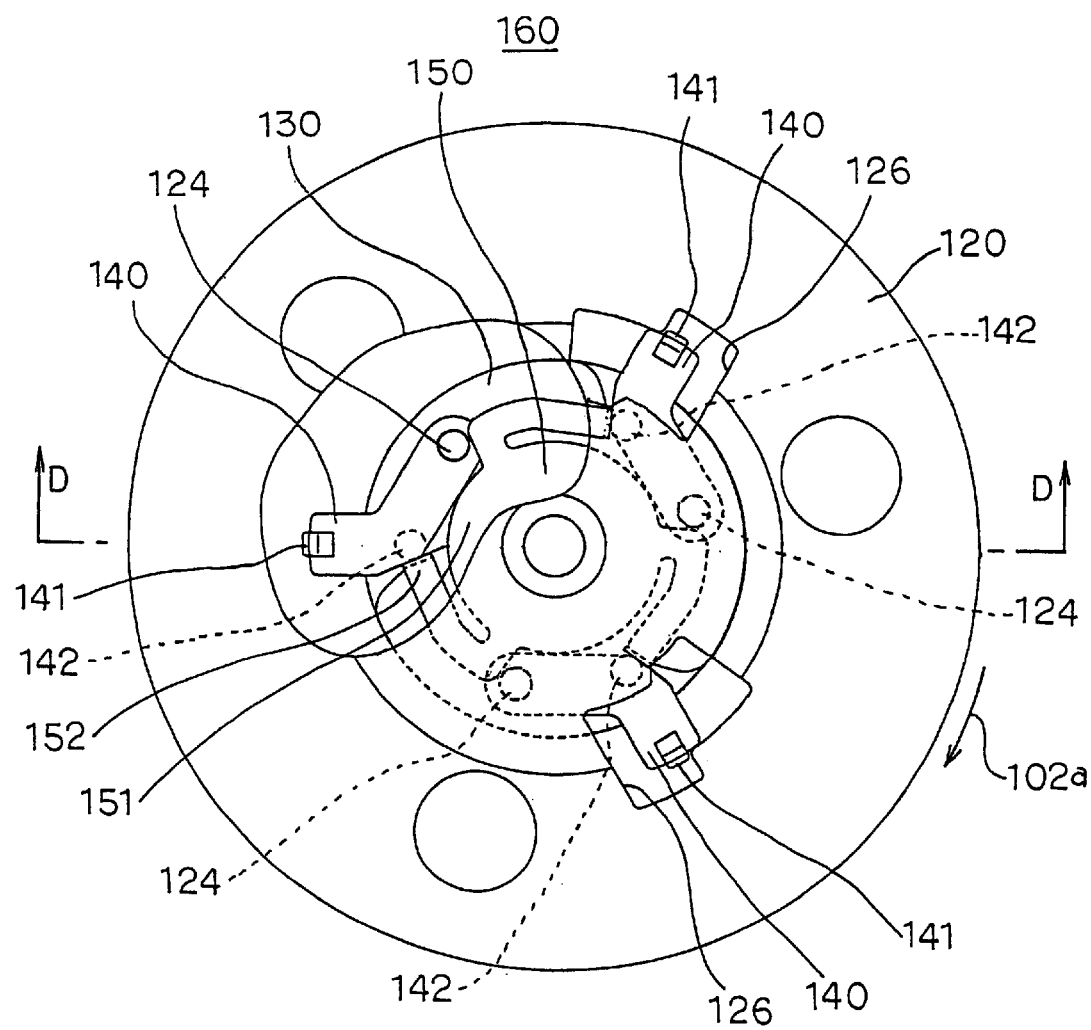
FIG. 4A is a fragmentary plan view showing the disc holding mechanism forming part of the disc drive apparatus shown in FIG. 3.
Figure 4B:
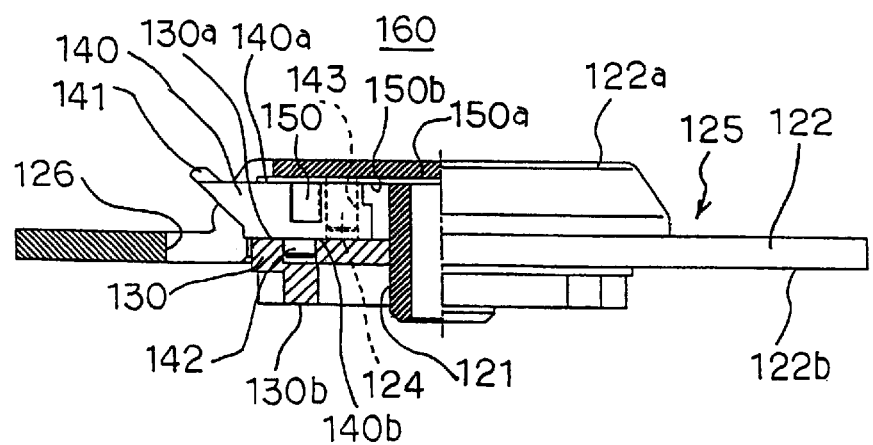
FIG. 4B is a fragmentary cross-sectional view taken along the lines D—D of FIG. 4A.

The cam member 130 is supported by the disc retaining member 120 and rockable with respect to the disc retaining member 120 around the rock axis of the cam member 130 to assume two different operation positions including a first rocking position shown in FIGS. 4A and 4B, and a second rocking position shown in FIGS. 2A and 2B. The cam member 130 has first and second surfaces 130a and 130b each held in perpendicular relationship to the rock axis of the cam member 130. The first surface 130a of the cam member 130 is held in opposing and spaced relationship with the cavity surface 123a of the disc retaining member 120. The second surface 130b of the cam member 130 is held in opposing and spaced relationship with the frame member 110. The cam member 130 has a peripheral end portion 131 having a plurality of teeth as will be seen particularly from FIG. 1.

The cam member 130 is formed with a through bore 132 open at the first and second surfaces 130a and 130b of the cam member 130. The cam member 130 is rockably supported by the disc retaining member 120 under the state that the shaft portion 121 of the disc retaining member 120 is received in the through bore 132 of the cam member 130.

Figure 6:
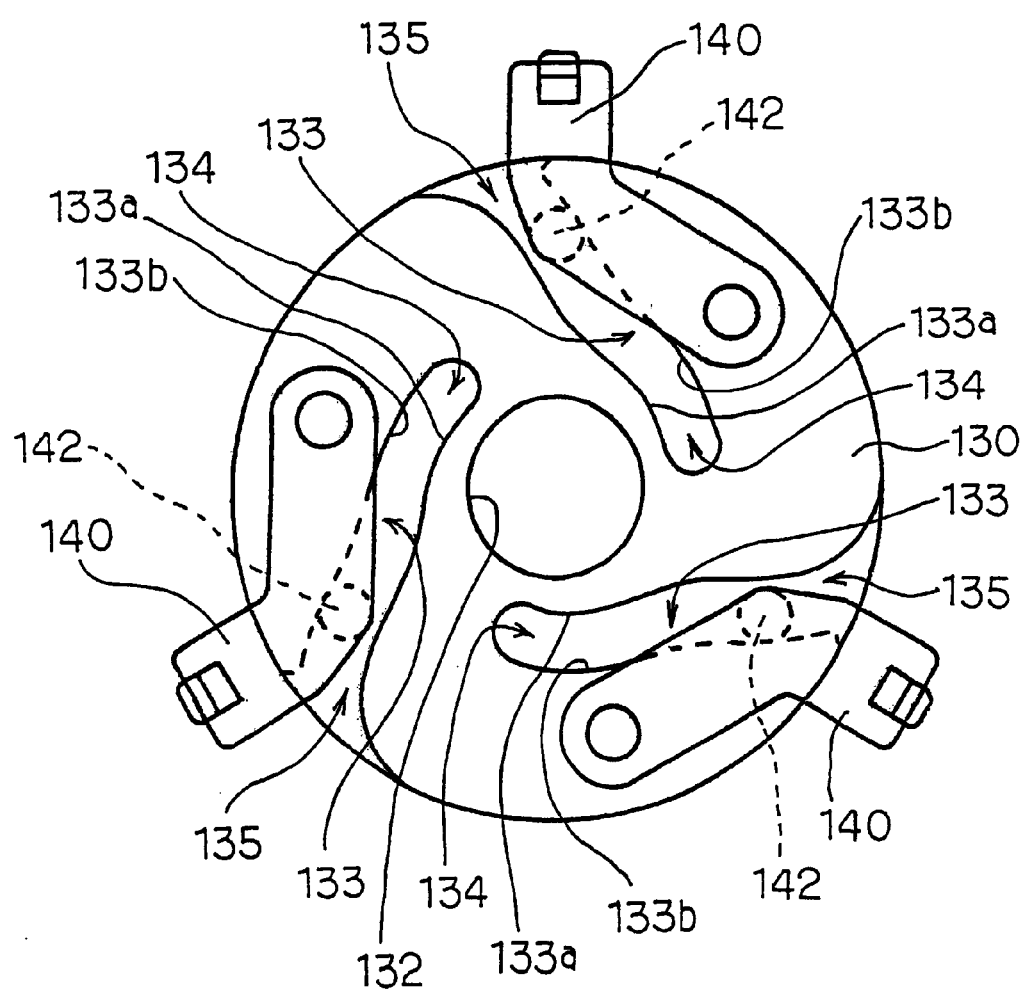
FIG. 6 is a plan view showing a cam member and a plurality of disc holding members forming part of the disc drive apparatus shown in FIG. 1.

As will be clearly seen from FIG. 6, the cam member 130 is formed at the first surface 130a of the cam member 130 with a plurality of grooves 133. The grooves 133 of the cam member 130 are disposed around the rock axis of the cam member 130 in equiangularly spaced relationship with each other. Each of the grooves 133 of the cam member 130 has a first groove portion 134 close to the rock axis of the cam member 130, and a second groove portion 135 remote from the rock axis of the cam member 130.

Each of the grooves 133 of the cam member 130 has opposing side surfaces 133a and 133b each held in parallel relationship with the rock axis of the cam member 130. Each of the grooves 133 of the cam member 130 has a center plane located between the opposing side surfaces 133a and 133b of each of the grooves 133 of the cam member 130 in equidistantly spaced relationship with the opposing side surfaces 133a and 133b of each of the grooves 133 of the cam member 130, and a perpendicular line held in perpendicular relationship to the center plane of each of the grooves 133 of the cam member 130.

In the first embodiment of the disc drive apparatus 100 according to the present invention, the opposing side surfaces 133a and 133b of each of the grooves 133 of the cam member 130 oppose and are spaced apart along the perpendicular line of each of the grooves 133 of the cam member 130 from each other at a predetermined space distance. The second groove portion 135 of each of the grooves 133 of the cam member 130 is larger in space distance than the first groove portion 134 of each of the grooves 133 of the cam member 130.

As will be seen from FIG. 5, the disc driving motor 112 has a rotation axis held in axial alignment with the rotation axis of the disc retaining member 120. The disc driving motor 112 is supported by the frame member 110 and includes a motor casing 113 provided on the frame member 110, and a rotation shaft 114 supported by the motor casing 113 of the disc driving motor 112 and rotatable around its rotation axis constituted by the rotation axis of the disc driving motor 112. The disc driving motor 112 is operatively connected to the disc retaining member 120 under the state that the rotation shaft 114 of the disc driving motor 112 is securely connected to the shaft portion 121 of the disc retaining member 120.

In FIGS. 1 to 4, the disc drive apparatus 100 further comprises a plurality of disc holding members 140 each supported by the disc retaining member 120 and operatively coupled with the cam member 130. Each of the disc holding members 140 is provided between the disc retaining member 120 and the cam member 130.

Each of the disc holding members 140 has a holding end 141 and is movable with respect to the disc retaining member 120 to assume two different operation positions including a disc holding position in which the holding end 141 of each of the disc holding members 140 is held in contact with the central portion of the optical disc to hold the optical disc to the disc retaining member 120 under the state that the cam member 130 is rocked to assume the first rocking position as shown in FIGS. 4A and 4B, and a disc releasing position in which the holding end 141 of each of the disc holding members 140 is held out of contact with the central portion of the optical disc to release the optical disc from the disc retaining member 120 under the state that the cam member 130 is rocked to assume the second rocking position as shown in FIGS. 2A and 2B. The holding end 141 of each of the disc holding members 140 is in the form of a pointed shape and extending radially outwardly of the disc retaining member 120.

Each of the disc holding members 140 is movable from the disc releasing position to the disc holding position to have the holding end 141 of each of the disc holding members 140 radially moved away from the rotation axis of the disc retaining member 120. Each of the disc holding members 140 is also movable from the disc holding position to the disc releasing position to have the holding end 141 of each of the disc holding members 140 radially moved toward the rotation axis of the disc retaining member 120. The disc holding members 140 are disposed around the rotation axis of the disc retaining member 120 in equiangularly spaced relationship with each other under the state that the holding end 141 of each of the disc holding members 140 is movable toward and away from the rotation axis of the disc retaining member 120 through each of the openings 126 of the disc retaining member 120.

Each of the disc holding members 140 has first and second surfaces 140*a* and 140*b* each held in perpendicular relationship to the rotation axis of the disc retaining member 120. The first surface 140*a* of each of the disc holding members 140 is held in opposing and spaced relationship with the cavity surface 123*a* of the disc retaining member 120. The second surface 140*b* of each of the disc holding members 140 is held in slidable contact with the first surface 130*a* of the cam member 130.

Each of the disc holding members 140 has a projection 142 projecting from the second surface 140*b* of each of the disc holding members 140 toward the frame member 110. The projection 142 of each of the disc holding members 140 is in the form of a cylindrical shape and has a center axis held in parallel relationship with the rotation axis of the disc retaining member 120. The projection 142 of each of the disc holding members 140 is received in each of the grooves 133 of the cam member 130. The space distance of the first groove portion 134 of each of the grooves 133 of the cam member 130 may be approximately equal to the diameter of the projection 142 of each of the disc holding members 140 as will be clearly seen from FIG. 6.

The projection 142 of each of the disc holding members 140 is slidably movable along the opposing side surfaces 133*a* and 133*b* of each of the grooves 133 of the cam member 130 to assume two different operation positions including a first groove position in which the projection 142 of each of the disc holding members 140 is located in the first groove portion 134 of each of the grooves 133 of the cam member 130 under the state that each of the disc holding members 140 is moved to assume the disc releasing position as shown in FIGS. 2A and 2B, and a second groove position in which the projection 142 of each of the disc holding members 140 is located in the second groove portion 135 of each of the grooves 133 of the cam member 130 under the state that each of the disc holding members 140 is moved to assume the disc holding position as shown in FIGS. 4A and 4B.

Each of the disc holding members 140 is formed with a through bore 143 open at the first and second surfaces 140*a* and 140*b* of each of the disc holding members 140. Each of the disc holding members 140 is movably supported by the disc retaining member 120 under the state that each of the projections 124 of the disc retaining member 120 is received in the through bore 143 of each of the disc holding members 140.

Each of the disc holding members 140 has a swing axis held in coaxial relationship with the center axis of each of the projections 124 of the disc retaining member 120. This means that the swing axis of each of the disc holding members 140 is held in parallel relationship with the rotation axis of the disc retaining member 120. Each of the disc holding members 140 is swingable around the swing axis of each of the disc holding members 140 with each of the disc holding members 140 being movable between the disc holding position and the disc releasing position.

In FIGS. 1 to 4, the disc drive apparatus 100 further comprises a resilient member 150 intervening between the disc retaining member 120 and each of the disc holding members 140 to have each of the disc holding members 140 resiliently urged to assume the disc holding position as shown in FIGS. 4A and 4B. The resilient member 150 has a center axis and is supported by the disc retaining member 120 under the state that the center axis of the resilient member 150 is held in coaxial relationship with the rotation axis of the disc retaining member 120.

The resilient member 150 has first and second surfaces 150*a* and 150*b* each held in perpendicular relationship to the center axis of the resilient member 150. The first surface 150*a* of the resilient member 150 is held in contact with the cavity surface 123*a* of the disc retaining member 120. The second surface 150*b* of the resilient member 150 is held in opposing and spaced relationship with the first surface 130*a* of the cam member 130.

Figure 7:
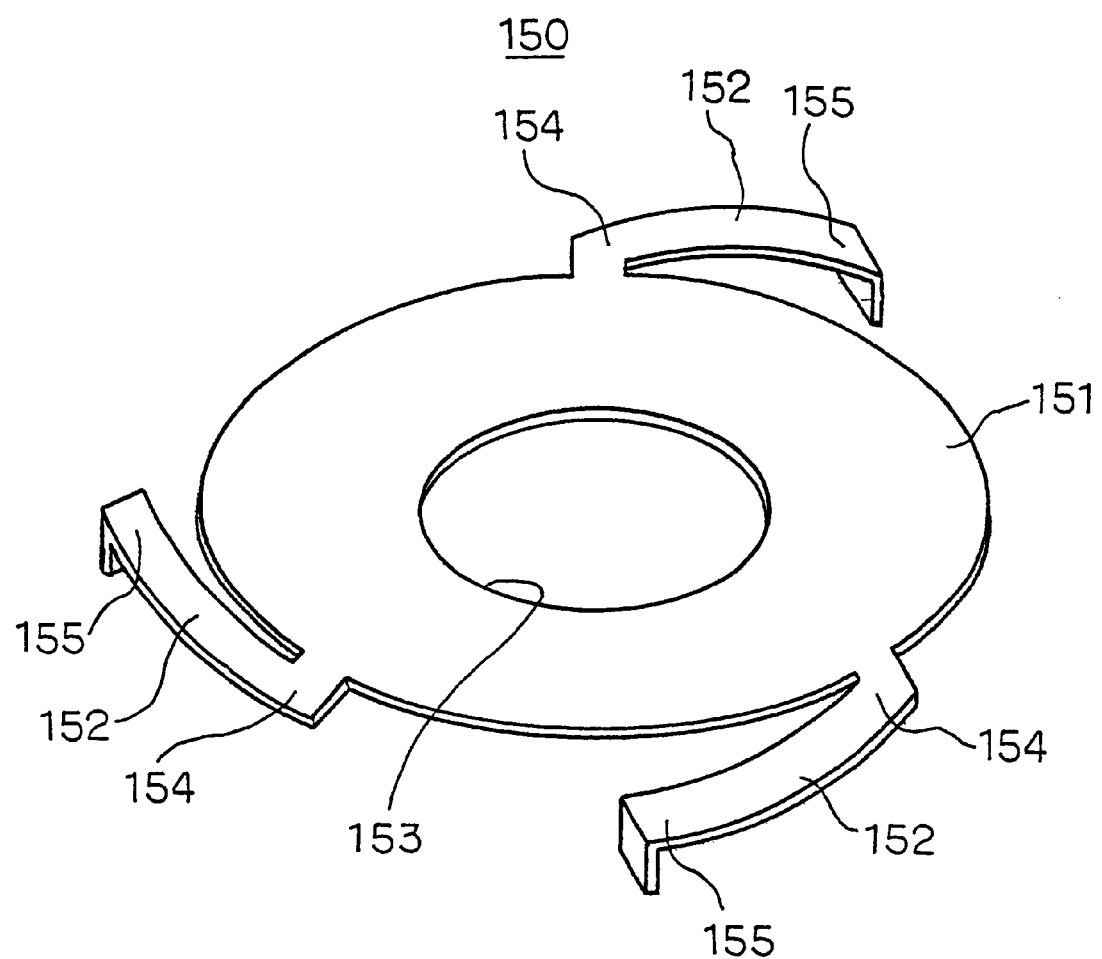
FIG. 7 is a perspective view showing a resilient member forming part of the disc drive apparatus shown in FIG. 1.

As will be clearly seen from FIG. 7, the resilient member 150 has a base portion 151 in the form of a disc shape, and a plurality of arm portions 152 each integrally formed with the base portion 151 of the resilient member 150 and radially outwardly extending from the base portion 151 of the resilient member 150. The base portion 151 of the resilient member 150 is formed with a through bore 153 open at the first and second surfaces 150*a* and 150*b* of the resilient member 150. The resilient member 150 is securely supported by the disc retaining member 120 under the state that the shaft portion 121 of the disc retaining member 120 is received in the through bore 153 of the base portion 151 of the resilient member 150.

Each of the arm portions 152 of the resilient member 150 is in the form of a strip shape. Each of the arm portions 152 of the resilient member 150 has a fixed end 154 connected to the base portion 151 of the resilient member 150, and a free end 155 held in contact with each of the disc holding members 140. The free end 155 of the each of the arm portions 152 of the resilient member 150 is in the form of a cranked shape. The arm portions 152 of the resilient member 150 are disposed around the rotation axis of the disc retaining member 120 in equiangularly spaced relationship with each other.

The disc retaining member 120, the cam member 130, the disc holding members 140, the resilient member 150 are collectively constitute a disc holding mechanism 160 designed to detachably hold the optical disc thereon.

In FIGS. 1 to 4, and 8, the disc drive apparatus 100 further comprises an optical pickup unit 170 movably supported by the frame member 110, pickup driving means which is constituted by a pickup driving motor 116 designed to drive the optical pickup unit 170, a transmitting mechanism 172 intervening between the pickup driving motor 116 and the optical pickup unit 170, and a screw rod 178 operatively coupled with the optical pickup unit 170.

The optical pickup unit 170 has a moving line held in perpendicular relationship to the rotation axis of the disc retaining member 120. The optical pickup unit 170 is movable toward and away from the rotation axis of the disc retaining member 120 along the moving line of the optical pickup unit 170. The optical pickup unit 170 is operative to record information to and reproduce information from the optical disc.

The optical pickup unit 170 is operative to assume two different operation states including a movable state in which the optical pickup unit 170 is movable toward and away from the rotation axis of the disc retaining member 120 along the moving line of the optical pickup unit 170 to record information to and reproduce information from the optical disc rotated by the disc driving motor 112, and a standstill state in which the optical pickup unit 170 is held at a standstill on the moving line of the optical pickup unit 170 as shown in FIG. 1.

While it has been described in the above that the optical pickup unit 170 is operative to record information to and reproduce information from the optical disc, the optical pickup unit 170 may be replaced by another optical pickup unit including an optical pickup unit operative to record information to the optical disc, and an optical pickup unit operative to reproduce information from the optical disc.

The pickup driving motor 116 is operative to drive the optical pickup unit 170 to be movable toward and away from the rotation axis of the disc retaining member 120 along the moving line of the optical pickup unit 170. The pickup driving motor 116 has a rotation axis held in parallel relationship with the moving line of the optical pickup unit 170. The pickup driving motor 116 is supported by the frame member 110 and including a motor casing 117 provided on the frame member 110, and a rotation shaft 118 supported by the motor casing 117 of the pickup driving motor 116 and rotatable around its rotation axis constituted by the rotation axis of the pickup driving motor 116.

The transmitting mechanism 172 intervenes between the pickup driving motor 116 and the optical pickup unit 170 to have the pickup driving motor 116 operatively connected to the optical pickup unit 170 through the transmitting mechanism 172 with the optical pickup unit 170 being movable toward and away from the rotation axis of the disc retaining member 120 along the moving line of the optical pickup unit 170.

Figure 8:
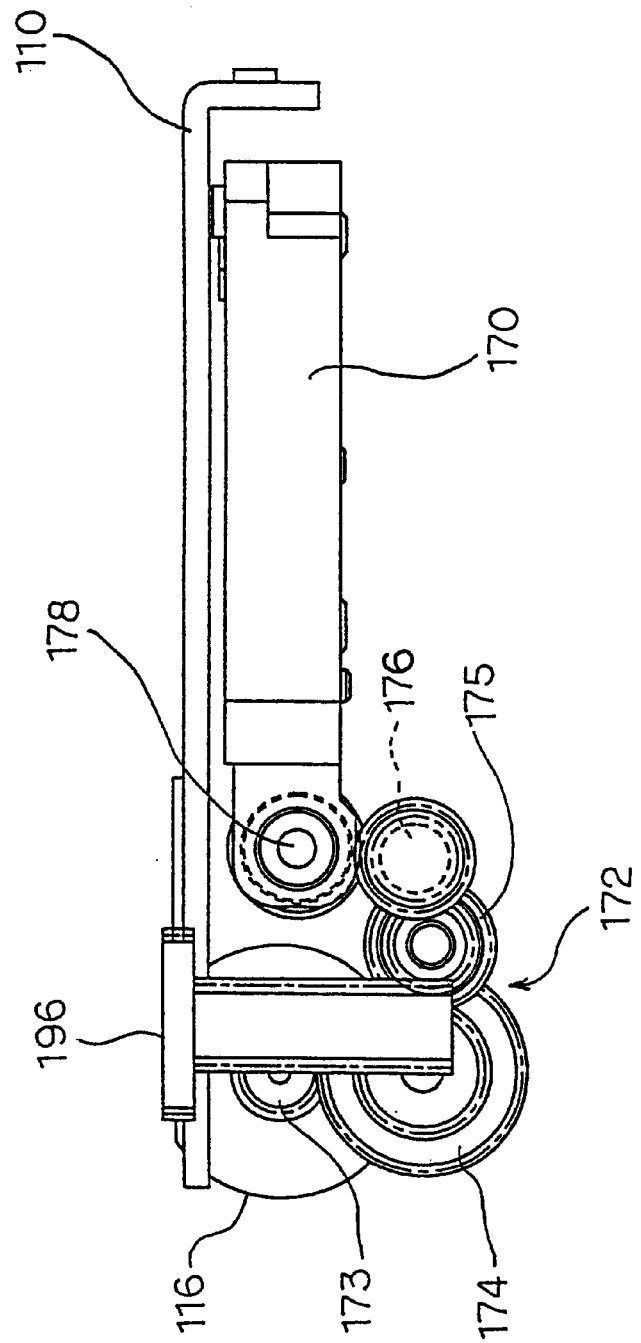
FIG. 8 is a side view taken along the lines B—B of FIG. 1.

The transmitting mechanism 172 includes a plurality of transmitting gears 173 to 176 intervening between the pickup driving motor 116 and the optical pickup unit 170 to transmit the rotation of the pickup driving motor 116 from the pickup driving motor 116 to the optical pickup unit 170 as will be clearly seen from FIG. 8.

The transmitting gears 173 to 176 of the transmitting mechanism 172 includes a first gear 173 securely connected to the rotation shaft 118 of the pickup driving motor 116, a second gear 174 held in mesh with the first gear 173 of the transmitting mechanism 172, a third gear 175 held in mesh with the second gear 174 of the transmitting mechanism 172, and a fourth gear 176 held in mesh with the third gear 175 of the transmitting mechanism 172.

The first gear 173 of the transmitting mechanism 172 has a rotation axis held in coaxial relationship with the rotation axis of the pickup driving motor 116. The first gear 173 of the transmitting mechanism 172 is rotatable around the rotation axis of the first gear 173 of the transmitting mechanism 172 in unison with the rotation shaft 118 of the pickup driving motor 116.

The second gear 174 of the transmitting mechanism 172 has a rotation axis held in parallel relationship with the rotation axis of the pickup driving motor 116. The second gear 174 of the transmitting mechanism 172 is supported by the frame member 110 and rotatable around the rotation axis of the second gear 174 of the transmitting mechanism 172 with respect to the frame member 110.

The third gear 175 of the transmitting mechanism 172 has a rotation axis held in parallel relationship with the rotation axis of the pickup driving motor 116. The third gear 175 of the transmitting mechanism 172 is supported by the frame member 110 and rotatable around the rotation axis of the third gear 175 of the transmitting mechanism 172 with respect to the flame member 110.

The fourth gear 176 of the transmitting mechanism 172 has a rotation axis held in parallel relationship with the rotation axis of the pickup driving motor 116. The fourth gear 176 of the transmitting mechanism 172 is supported by the flame member 110 and rotatable around the rotation axis of the fourth gear 176 of the transmitting mechanism 172 with respect to the frame member 110.

The screw rod 178 is operatively coupled with the optical pickup unit 170 to transmit the rotation of the pickup driving motor 116 from the transmitting mechanism 172 to the optical pickup unit 170. The screw rod 178 has a rotation axis held in parallel relationship with the moving line of the optical pickup unit 170. The screw rod 178 is supported by the frame member 110 and rotatable around the rotation axis of the screw rod 178. The screw rod 178 is held in mesh with the fourth gear 176 of the transmitting mechanism 172 and the optical pickup unit 170.

In FIGS. 1 to 4, the disc drive apparatus 100 further comprises a cam rocking member 180 supported by the frame member 110 and having a first end portion 181 close to the cam member 130, and a second end portion 182 remote from the cam member 130. The cam rocking member 180 has a protrusion 183 located between the first and second end portions 181 and 182 of the cam rocking member 180.

The cam rocking member 180 has a moving line held in parallel relationship with the moving line of the optical pickup unit 170. The cam rocking member 180 is movable with respect to the frame member 110 along the moving line of the cam rocking member 180 to assume two different operation positions including an engaging position in which the first end portion 181 of the cam rocking member 180 is held in engagement with the cam member 130 to have the cam member 130 rocked to assume the second rocking position as shown in FIG. 1, and a disengaging position in which the first end portion 181 of the cam rocking member 180 is held out of engagement with the cam member 130 to have the cam member 130 rocked to assume the first rocking position as shown in FIG. 3.

Each of the first and second end portions 181 and 182 of the cam rocking member 180 has a plurality of teeth arranged in parallel relationship with the moving line of the cam rocking member 180. The first end portion 181 of the cam rocking member 180 is held in mesh with the peripheral end portion 131 of the cam member 130 under the state that the cam rocking member 180 is moved to assume the engaging position as will be seen particularly from FIG. 1.

In FIGS. 1 to 4, and 8, the disc drive apparatus 100 further comprises a changeover mechanism 190 intervening between the pickup driving motor 116 and the cam rocking member 180, and an idler gear 196 operatively coupled with the cam rocking member 180.

Figure 3:
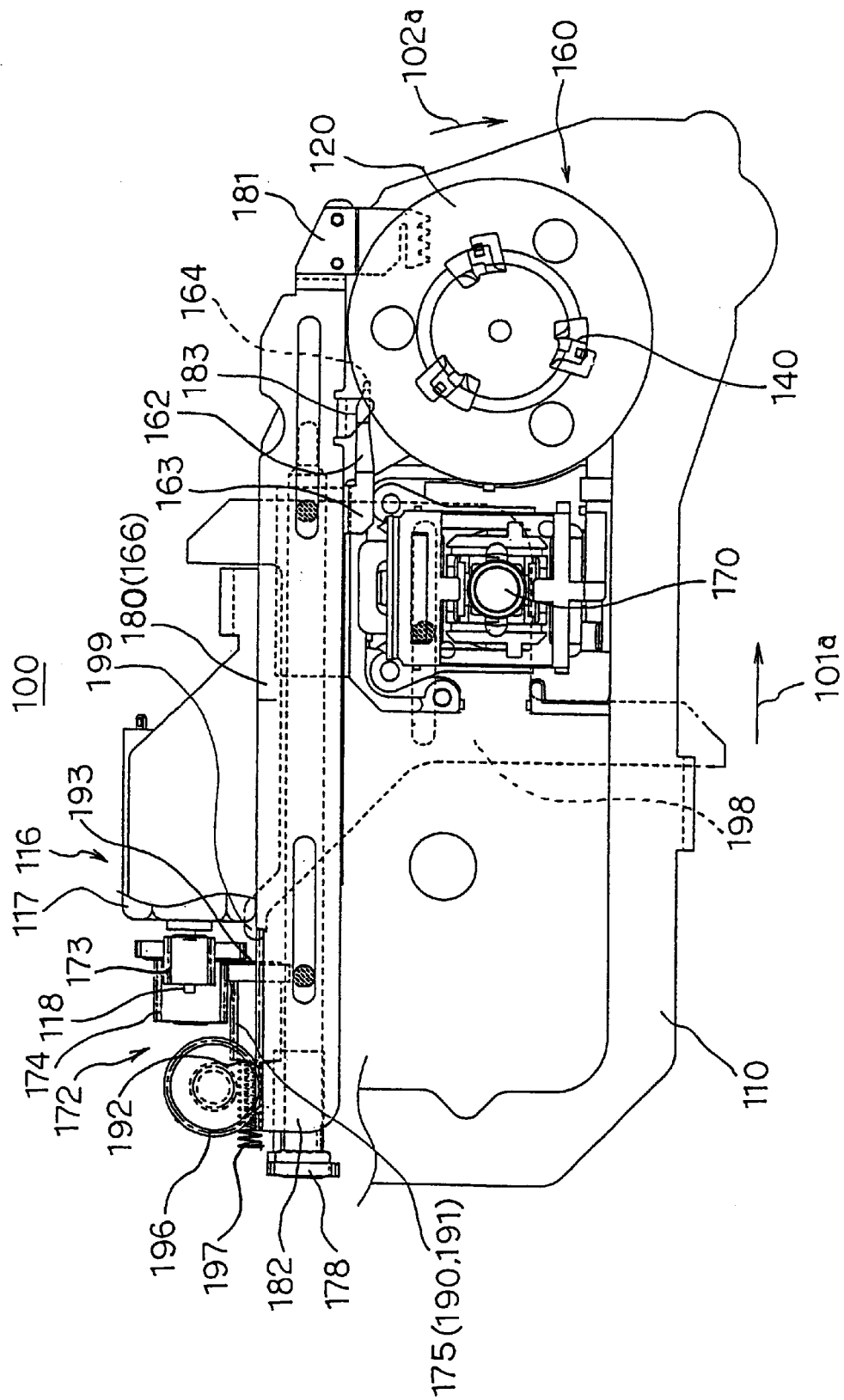
FIG. 3 is a plan view similar to FIG. 1 but showing an operation state in which an optical disc, not shown, is mounted on the disc retaining member forming part of the disc drive apparatus shown in FIG. 1.

The changeover mechanism 190 is operative to assume two different operation states including a connecting state in which the pickup driving motor 116 is operatively connected to the cam rocking member 180 through the changeover mechanism 190 to have the cam rocking member 180 moved between the engaging position and the disengaging position as shown in FIG. 1, and a disconnecting state in which the pickup driving motor 116 is disconnected from the cam rocking member 180 as shown in FIG. 3.

The changeover mechanism 190 includes a changeover gear 191 supported by the frame member 110 and rotatable around its rotation axis. The rotation axis of the changeover gear 191 of the changeover mechanism 190 is held in parallel relationship with the rotation axis of the pickup driving motor 116. This means that the rotation axis of the changeover gear 191 of the changeover mechanism 190 is held in parallel relationship with the moving line of the optical pickup unit 170. The changeover gear 191 of changeover mechanism 190 has first and second axial ends 192 and 193.

The changeover gear 191 of the changeover mechanism 190 intervenes between the transmitting mechanism 172 and the cam rocking member 180 and is axially movable along the rotation axis of the changeover gear 191 of the changeover mechanism 190 to assume two different operation positions including a connecting position in which the rotation of the pickup driving motor 116 is transmitted from the transmitting mechanism 172 to the cam rocking member 180 through the changeover gear 191 of the changeover mechanism 190 under the state that the changeover mechanism 190 is operated to assume the connecting state as shown in FIG. 1, and a disconnecting position in which the pickup driving motor 116 is disconnected from the cam rocking member 180 under the state that the changeover mechanism 190 is operated to assume the disconnecting state as shown in FIG. 3.

The changeover gear 191 of the changeover mechanism 190 may be constituted by one of the transmitting gears 173 to 176 of the transmitting mechanism 172. More specifically, the changeover gear 191 of the changeover mechanism 190 may be constituted by the third gear 175 of the transmitting mechanism 172 and held in mesh with the second and fourth gears 174 to 176 of the transmitting mechanism 172 as will be clearly seen from FIG. 8.

The idler gear 196 is operatively coupled with the cam rocking member 180 to transmit the rotation of the pickup driving motor 116 from the changeover mechanism 190 to the cam rocking member 180 under the state that the changeover mechanism 190 is operated to assume the connecting state. The idler gear 196 has a rotation axis held in parallel relationship with the rotation axis of the disc retaining member 120. The idler gear 196 is supported by the frame member 110 and rotatable around the rotation axis of the idler gear 196. The idler gear 196 is held in mesh with the second end portion 182 of the cam rocking member 180.

The changeover gear 191 of the changeover mechanism 190 is axially movable to assume the connecting position under the state that the changeover gear 191 of the changeover mechanism 190 is held in mesh with the idler gear 196 to have the rotation of the pickup driving motor 116 transmitted from the pickup driving motor 116 to the cam rocking member 180 through the first and second gears 173 and 174 of the transmitting mechanism 172, the changeover gear 191 of the changeover mechanism 190 and the idler gear 196. The changeover gear 191 of the changeover mechanism 190 is also axially movable to assume the disconnecting position under the state that the changeover gear 191 of the changeover mechanism 190 is held out of mesh with the idler gear 196 to have the pickup driving motor 116 disconnected from the cam rocking member 180.

In FIGS. 1 to 4, the disc drive apparatus 100 further comprises a gear urging member 197 intervening between the frame member 110 and the changeover gear 191 of the changeover mechanism 190, a gear holding member 198 movably supported by the frame member 110, a base member, not shown, designed to mount the frame member 110 thereon, and a plurality of damping members, not shown, each intervening between the base member and the frame member 110 to damp vibrations imparted from the base member to the frame member 110.

The gear urging member 197 intervenes between the frame member 110 and the changeover gear 191 of the changeover mechanism 190 to have the changeover gear 191 of the changeover mechanism 190 resiliently urged to assume the disconnecting position as shown in FIG. 3. The gear urging member 197 is elastically deformable along its center axis. The gear urging member 197 is connected to the first axial end 192 of the changeover gear 191 of changeover mechanism 190 under the state that the center axis of the gear urging member 197 is held in axial alignment with the rotation axis of the changeover gear 191 of the changeover mechanism 190. The gear urging member 197 may be made of a coil spring.

The gear holding member 198 has a holding end 199 and is movable with respect to the frame member 110 to assume two different operation positions including a gear holding position in which the holding end 199 of the gear holding member 198 is held in contact with the second axial end 193 of the changeover gear 191 of the changeover mechanism 190 to have the changeover gear 191 of the changeover mechanism 190 axially moved against the resilient force of the gear urging member 197 to assume the connecting position as shown in FIG. 1, and a gear releasing position in which the holding end 199 of the gear holding member 198 is held out of contact with the second axial end of the changeover gear 191 of the changeover mechanism 190 to have the changeover gear 191 of the changeover mechanism 190 axially moved by the resilient force of the gear urging member 197 to assume the disconnecting position as shown in FIG. 3. The holding end 199 of the gear holding member 198 is in the form of a round shape.

The gear holding member 198 has a moving line held in parallel relationship with the rotation axis of the changeover gear 191 of the changeover mechanism 190. The gear holding member 198 is movable between the gear holding position and the gear releasing position along the moving line of the gear holding member 198.

The gear holding member 198 intervenes between the base member and the frame member 110 and is operative to assume two different operation states including a frame holding state in which the frame member 110 is fixedly connected to the base member through the gear holding member 198 under the state that the gear holding member 198 is moved to assume the gear holding position as shown in FIG. 1, and a frame releasing state in which the frame member 110 is resiliently connected to the base member through each of the damping members under the state that the gear holding member 198 is moved to assume the gear releasing position as shown in FIG. 3.

In FIGS. 1 to 5, the disc drive apparatus 100 further comprises a flange holding arm 162 elastically deformably supported by the frame member 110, and an arm holding member 166 movably supported by the frame member 110.

The flange holding arm 162 has a fixed end 163 connected to the frame member 110, and a free end 164 spaced apart from the frame member 110 as will be clearly seen from FIG. 5. The flange holding arm 162 is elastically deformable to assume two different operation states including a flange holding state in which the free end 164 of the flange holding arm 162 is held in engagement with the disc retaining member 120 to have the disc retaining member 120 fixedly supported by the frame member 110 through the flange holding arm 162 as shown in FIGS. 1 and 5, and a flange releasing state in which the free end 164 of the flange holding arm 162 is held out of engagement with the disc retaining member 120 to have the disc retaining member 120 rotatably supported by the frame member 110 as shown in FIG. 3. The free end 164 of the flange holding arm 162 is received in one of the recesses 127 of the retaining portion 122 of the disc retaining member 120 under the state that the flange holding arm 162 is elastically deformed to assume the flange holding state as will be clearly seen from FIG. 5.

The arm holding member 166 is movable with respect to the frame member 110 to assume two different operation positions including an arm holding position in which the arm holding member 166 is held in contact with the flange holding arm 162 to have the flange holding arm 162 elastically deformed to assume the flange releasing state as shown in FIG. 3, and an arm releasing position in which the arm holding member 166 is held out of contact with the flange holding arm 162 to have the flange holding arm 162 elastically deformed to assume the flange holding state as shown in FIGS. 1 and 5.

The arm holding member 166 may be constituted by the cam rocking member 180. The cam rocking member 180 is supported by the frame member 110 and movable with respect to the frame member 110 to assume two different operation positions including an arm holding position in which the protrusion 183 of the cam rocking member 180 is held in contact with the flange holding arm 162 to have the flange holding arm 162 elastically deformed to assume the flange releasing state under the state that the cam rocking member 180 is moved to assume the disengaging position as shown in FIG. 3, and an arm releasing position in which the protrusion 183 of the cam rocking member 180 is held out of contact with the flange holding arm 162 to have the flange holding arm 162 elastically deformed to assume the flange holding state under the state that the cam rocking member 180 is moved to assume the engaging position as shown in FIGS. 1 and 5.

The operation of the disc drive apparatus 100 will be described hereinafter with reference to the drawings shown in FIGS. 1 to 8.

The following description will be described to the case that the optical disc is mounted on the disc retaining member 120. In this case, the disc retaining member 120 is operated to assume the non-retaining state with each of the disc holding members 140 being moved to assume the disc releasing position before the optical disc is mounted on the disc retaining member 120.

The disc retaining member 120 is held in the non-retaining state in which the optical disc is dismounted from the disc retaining member 120 as shown in FIG. 1 until the optical disc is mounted on the disc retaining member 120.

When the optical disc, not shown, is mounted on the disc retaining member 120 with the disc retaining member 120 being operated to assume the disc retaining state, the disc detecting unit, not shown, is operated to detect the optical disc mounted on the disc retaining member 120.

When the disc detecting unit is operated to detect the optical disc mounted on the disc retaining member 120, the cam rocking member 180 is moved by the pickup driving motor 116 through the transmitting mechanism 172, the changeover mechanism 190 and the idler gear 196 in a direction shown by an arrow 110a to assume the disengaging position in which the first end portion 181 of the cam rocking member 180 is held out of engagement with the cam member 130 as shown in FIG. 3. At this time, the cam rocking member 180 is simultaneously operated to assume the arm holding position in which the protrusion 183 of the cam rocking member 180 is held in contact with the flange holding arm 162 to have the flange holding arm 162 elastically deformed to assume the flange releasing state.

When the cam rocking member 180 is moved by the pickup driving motor 116 to assume the disengaging position, the cam member 130 is rocked by the cam rocking member 180 in a direction shown by an arrow 102a to assume the first rocking position as shown in FIGS. 4A and 4B.

When the cam member 130 is rocked by the cam rocking member 180 to assume the first rocking position, each of the disc holding members 140 is moved by the cam member 130 to assume the disc holding position in which the holding end 141 of each of the disc holding members 140 is held in contact with the central portion of the optical disc to hold the optical disc to the disc retaining member 120 as shown in FIGS. 4A and 4B.

When each of the disc holding members 140 is moved by the cam member 130 to assume the disc holding position, the gear holding member 198 is moved to assume the gear releasing position in which the holding end 199 of the gear holding member 198 is held out of contact with the second axial end 193 of the changeover gear 191 of the changeover mechanism 190 as shown in FIG. 3. At this time, the gear holding member 198 is simultaneously operated to assume the frame releasing state in which the frame member 110 is resiliently connected to the base member through each of the damping members.

When the gear holding member 198 is moved to assume the gear releasing position, the changeover gear 191 of the changeover mechanism 190 is axially moved by the resilient force of the gear urging member 197 to assume the disconnecting position in which the pickup driving motor 116 is disconnected from the cam rocking member 180 as shown in FIG. 3.

When the changeover gear 191 of the changeover mechanism 190 is axially moved by the resilient force of the gear urging member 197 to assume the disconnecting position, the optical pickup unit 170 is operated to assume the movable state in which the optical pickup unit 170 is movable toward and away from the rotation axis of the disc retaining member 120 to record information to and reproduce information from the optical disc rotated by the disc driving motor 112.

The following description will be described to the case that the optical disc is dismounted from the disc retaining member 120. In this case, the disc retaining member 120 is operated to assume the disc retaining state with each of the disc holding members 140 being moved to assume the disc holding position before the optical disc is dismounted from the disc retaining member 120.

The disc retaining member 120 is held in the disc retaining state in which the optical disc, not shown, is mounted on the disc retaining member 120 as shown in FIG. 3 until the optical pickup unit 170 is operated to assume the standstill state.

When the optical pickup unit 170 is operated to assume the standstill state in which the optical pickup unit 170 is held at a standstill on the moving line of the optical pickup unit 170, the gear holding member 198 is moved to assume the gear holding position in which the holding end 199 of the gear holding member 198 is held in contact with the second axial end 193 of the changeover gear 191 of the changeover mechanism 190 as shown in FIG. 1. At this time, the gear holding member 198 is simultaneously operated to assume the frame holding state in which the frame member 110 is fixedly connected to the base member, not shown, through the gear holding member 198.

When the gear holding member 198 is moved to assume the gear holding position, the changeover gear 191 of the changeover mechanism 190 is axially moved by the gear holding member 198 against the resilient force of the gear urging member 197 to assume the connecting position in which the rotation of the pickup driving motor 116 is transmitted from the transmitting mechanism 172 to the cam rocking member 180 through the changeover gear 191 of the changeover mechanism 190 as shown in FIG. 1.

When the changeover gear 191 of the changeover mechanism 190 is axially moved by the gear holding member 198 to assume the connecting position, the cam rocking member 180 is moved by the pickup driving motor 116 through the transmitting mechanism 172, the changeover mechanism 190 and the idler gear 196 in a direction shown by an arrow 101b to assume the engaging position in which the first end portion 181 of the cam rocking member 180 is held in engagement with the cam member 130 as shown in FIG. 1. At this time, the cam rocking member 180 is simultaneously operated to assume the arm releasing position in which the protrusion 183 of the cam rocking member 180 is held out of contact with the flange holding arm 162 to have the flange holding arm 162 elastically deformed to assume the flange holding state.

When the cam rocking member 180 is moved by the pickup driving motor 116 to assume the engaging position, the cam member 130 is rocked by the cam rocking member 180 in a direction shown by an arrow 102b to assume the second rocking position as shown in FIGS. 2A and 2B.

When the cam member 130 is rocked by the cam rocking member 180 to assume the second rocking position, each of the disc holding members 140 is moved by the cam member 130 to assume the disc releasing position in which the holding end 141 of each of the disc holding members 140 is held out of contact with the central portion of the optical disc to release the optical disc from the disc retaining member 120 as shown in FIGS. 2A and 2B.

When each of the disc holding members 140 is moved by the cam member 130 to assume the disc releasing position, the optical disc is dismounted from the disc retaining member 120 with the disc retaining member 120 being operated to assume the non-retaining state as shown in FIG. 1.

The disc retaining member 120 is then held in the non-retaining state until the optical disc is mounted on the disc retaining member 120.

As will be seen from the foregoing description, the first embodiment of the disc drive apparatus according to the present invention makes it possible 1) to be reduced in number of the constitution parts, 2) to be simple in construction, and 3) to be inexpensive in production cost, resulting from the fact that the resilient member intervenes between the disc retaining member and each of the disc holding members.

The fact that the second groove portion of each of the grooves of the cam member is larger in space distance than the first groove portion of each of the grooves of the cam member leads to the fact that the cam member is entirely rocked to assume the first rocking position to have each of the disc holding members held in contact with the central portion of the optical disc. Accordingly, the first embodiment of the disc drive apparatus according to the present invention makes it possible 4) to be operated to have the optical disc mounted thereon with a sufficient holding force to hold the optical disc.

The fact that the pickup driving motor is operatively connected to the cam rocking member through the changeover mechanism to have the cam rocking member moved between the engaging position and the disengaging position leads to the fact that the optical pickup unit is increased in thrust force. Accordingly, the first embodiment of the disc drive apparatus according to the present invention makes it possible 5) to be operated to drive the optical pickup unit with a sufficient transport speed to record information to and reproduced information from the optical disc.

While the disc drive apparatus 100 has been described in the above as comprising a changeover mechanism 190 operative to have the cam rocking member 180 moved between the engaging position and the disengaging position as shown in FIGS. 1 and 3, the changeover mechanism 190 may be replaced by a driving lever operative to have the cam rocking member moved between the engaging position and the disengaging position according to the present invention.

A second preferred embodiment directed to a driving lever operative to have the cam rocking member moved between the engaging position and the disengaging position will now be described in detail in accordance with the accompanying drawings.

Figure 9:
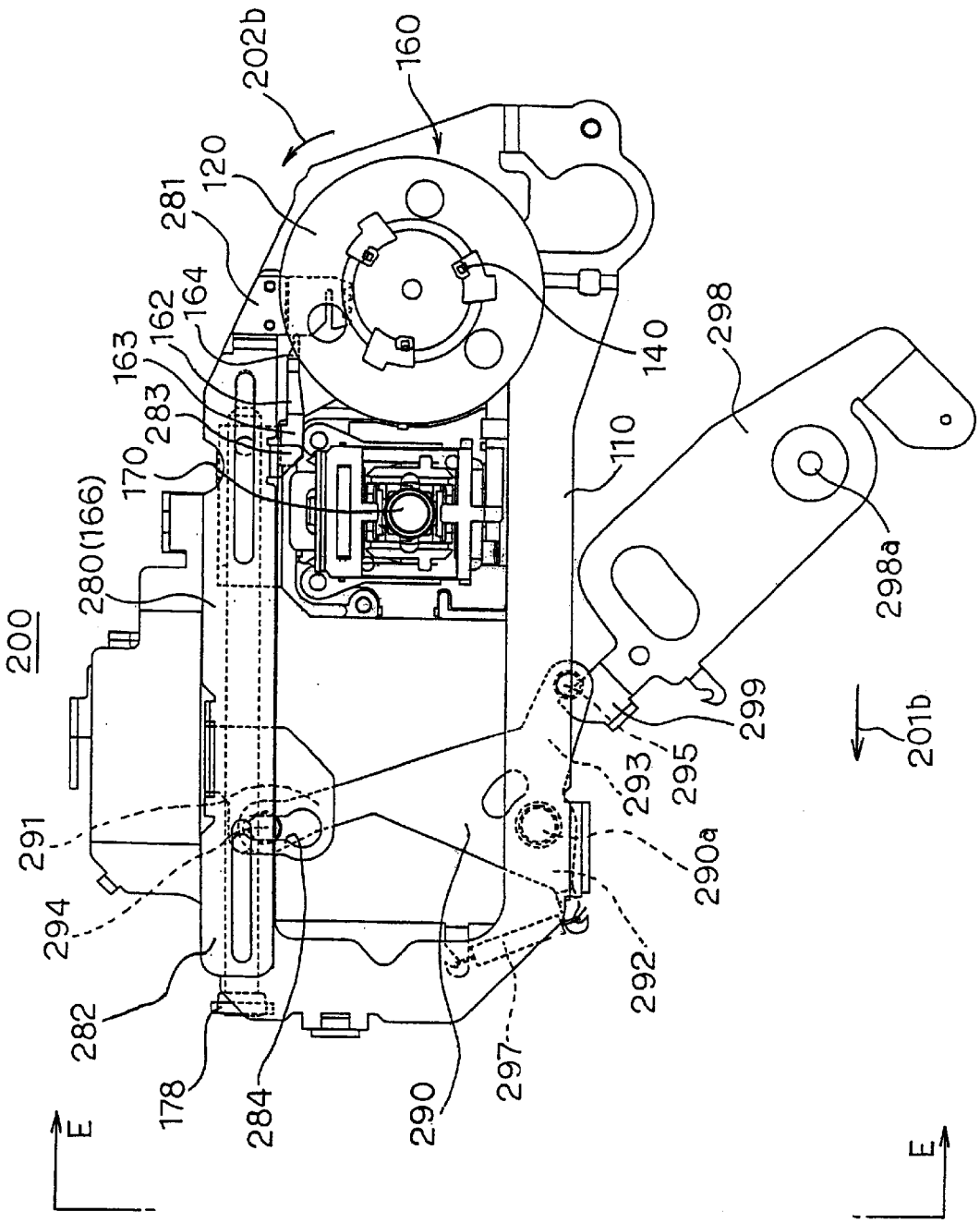
FIG. 9 is a plan view showing a second embodiment of the disc drive apparatus according to the present invention and showing an operation state in which an optical disc is dismounted from a disc retaining member forming part of the disc drive apparatus according to the present invention.
Figure 10:
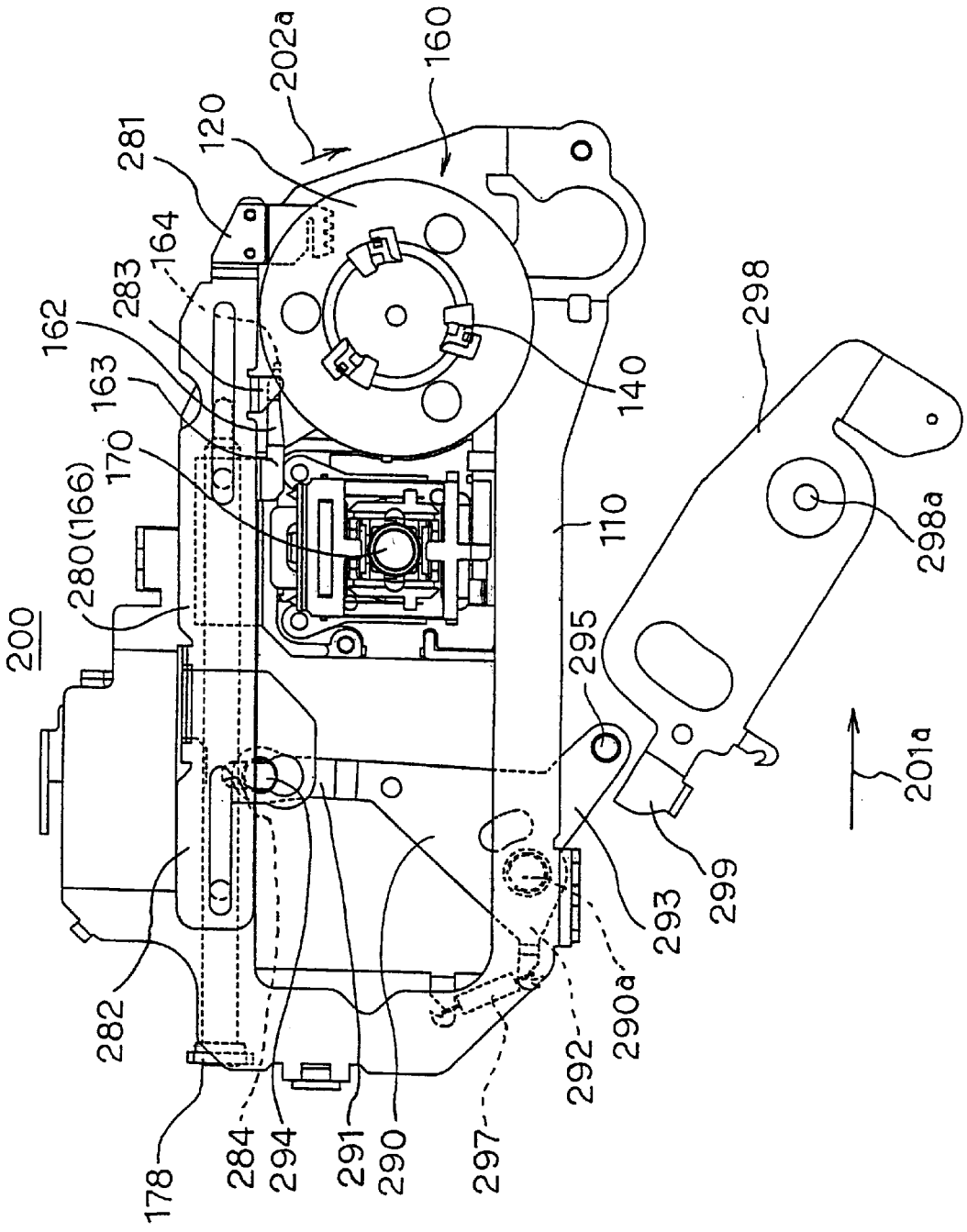
FIG. 10 is a plan view similar to FIG. 9 but showing an operation state in which an optical disc, not shown, is mounted on the disc retaining member forming part of the disc drive apparatus shown in FIG. 9.
Figure 11:
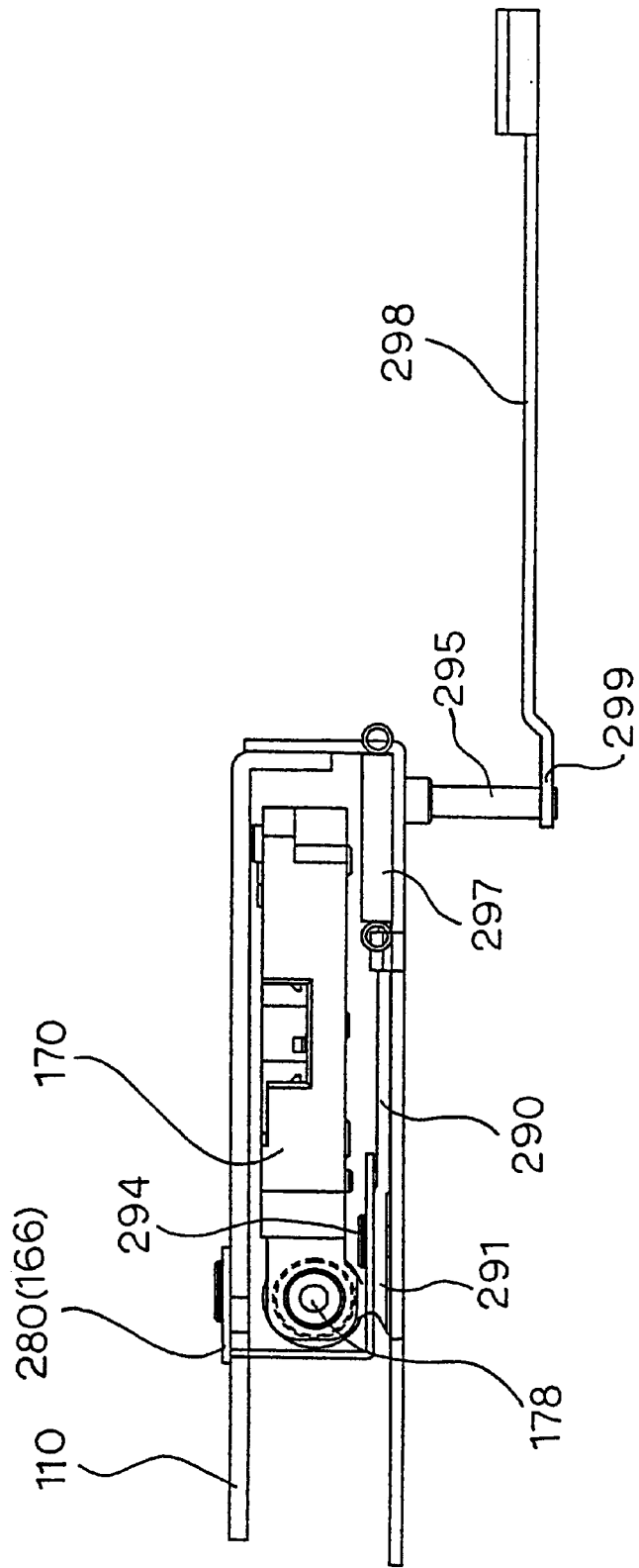
FIG. 11 is a side view taken along the lines E—E of FIG. 9.

Referring now to the drawings, in particular to FIGS. 9 to 11, there is shown the second preferred embodiment of the disc drive apparatus according to the present invention. The disc drive apparatus 200 comprises a cam rocking member 280 supported by the frame member 110 and having a first end portion 281 close to the cam member 130, and a second end portion 282 remote from the cam member 130. The cam rocking member 280 has a protrusion 283 located between the first and second end portions 281 and 282 of the cam rocking member 280.

The cam rocking member 280 has a moving line held in parallel relationship with the moving line of the optical pickup unit 170. The cam rocking member 280 is movable with respect to the frame member 110 along the moving line of the cam rocking member 280 to assume two different operation positions including an engaging position in which the first end portion 281 of the cam rocking member 280 is held in engagement with the cam member 130 to have the cam member 130 rocked to assume the second rocking position as shown in FIG. 9, and a disengaging position in which the first end portion 281 of the cam rocking member 280 is held out of engagement with the cam member 130 to have the cam member 130 rocked to assume the first rocking position as shown in FIG. 10.

The first end portion 281 of the cam rocking member 280 has a plurality of teeth arranged in parallel relationship with the moving line of the cam rocking member 280. The second end portion 282 of the cam rocking member 280 is formed with an opening 284. The first end portion 281 of the cam rocking member 280 is held in mesh with the peripheral end portion 131 of the cam member 130 under the state that the cam rocking member 280 is moved to assume the engaging position as will be seen particularly from FIG. 9.

The cam rocking member 280 may constitute the arm holding member 166. The cam rocking member 280 is supported by the frame member 110 and movable with respect to the frame member 110 to assume two different operation positions including an arm holding position in which the protrusion 283 of the cam rocking member 280 is held in contact with the flange holding arm 162 to have the flange holding arm 162 elastically deformed to assume the flange releasing state under the state that the cam rocking member 280 is moved to assume the disengaging position as shown in FIG. 10, and an arm releasing position in which the protrusion 283 of the cam rocking member 280 is held out of contact with the flange holding arm 162 to have the flange holding arm 162 elastically deformed to assume the flange holding state under the state that the cam rocking member 280 is moved to assume the engaging position as shown in FIG. 9.

The disc drive apparatus 200 further comprises a driving lever 290 supported by the frame member 110 and operatively connected to the cam rocking member 280. The driving lever 290 is movable with respect to the frame member 110 to assume two different operation positions including a first driving position in which the driving lever 290 is operative to drive the cam rocking member 280 to be moved to assume the engaging position as shown in FIG. 9, and a second driving position in which the driving lever 290 is operative to drive the cam rocking member 280 to be moved to assume the disengaging position as shown in FIG. 10.

The driving lever 290 has a pivot axis held in parallel relationship with the rotation axis of the disc retaining member 120. The driving lever 290 is pivotable around the pivot axis of the driving lever 290 with the driving lever 290 being movable between the first and second driving position.

The driving lever 290 has a fulcrum portion 290a pivotably connected to the frame member 110, and first to third end portions 291 to 293 each extending from the fulcrum portion 290a of the driving lever 290. The first end portion 291 of the driving lever 290 is operatively coupled with the second end portion 282 of the cam rocking member 280 to transmit the pivoting motion of the driving lever 290 to the cam rocking member 280. The first end portion 291 of the driving lever 290 has a pin 294 slidably received in the opening 284 of the second end portion 282 of the cam rocking member 280. The second end portion 292 of the driving lever 290 is in the form of a hook shape. The third end portion 293 of the driving lever 290 has a rod 295 having a center axis held in parallel relationship with the pivot axis of the driving lever 290.

The disc drive apparatus 200 further comprises lever urging means which is constituted by a lever urging member 297 designed to urge the driving lever 290 to assume the second driving position, and a lever holding member 298 movable with respect to the frame member 110.

The lever urging member 297 intervenes between the frame member 110 and the driving lever 290 to have the driving lever 290 resiliently urged to assume the second driving position. The lever urging member 297 is anchored at one end to the frame member 110 and at the other end to the second end portion 292 of the driving lever 290. The lever urging member 297 may be made of a coil spring.

The lever holding member 298 has a holding end 299 and is movable with respect to the frame member 110 to assume two different operation positions including a lever holding position in which the holding end 299 of the lever holding member 298 is held in contact with the rod 295 of the third end portion 293 of the driving lever 290 to have the driving lever 290 moved against the resilient force of the lever urging member 297 to assume the first driving position as shown in FIG. 9, and a lever releasing position in which the holding end 299 of the lever holding member 298 is held out of contact with the rod 295 of the third end portion 293 of the driving lever 290 to have the driving lever 290 moved by the resilient force of the lever urging member 297 to assume the second driving position as shown in FIG. 10.

The lever holding member 298 has a pivot axis held in parallel relationship with the rotation axis of the disc retaining member 120. The lever holding member 298 is pivotable around the pivot axis of the lever holding member 298 with the lever holding member 298 being movable between the lever holding position and lever releasing position. The lever holding member 298 has a fulcrum portion 298a pivotably connected to the base member.

The disc drive apparatus 200 further comprises a disc loading mechanism, not shown, designed to carry the optical disc to and from the disc retaining member 120, a disc guiding mechanism, not shown, designed to guide the optical disc carried by the disc loading mechanism to and from the disc retaining member 120, and a driving motor, not shown, designed to drive the disc loading mechanism, the disc guiding mechanism, and other components of the disc drive apparatus 200. The driving motor is operatively connected to the lever holding member 298 to drive the lever holding member 298 to be movable between the lever holding position and lever releasing position.

The above description of the second embodiment has been made only about the cam rocking member 280, the driving lever 290, the lever urging member 297, and the lever holding member 298 different from those of the first embodiment, but has not been directed to the frame member 110, the disc driving motor 112, the pickup driving motor 116, the disc retaining member 120, the cam member 130, the disc holding members 140, the resilient member 150, the disc holding mechanism 160, the flange holding arm 162, the arm holding member 166, the optical pickup unit 170, the transmitting mechanism 172 and the screw rod 178 which are entirely the same as those of the first embodiment. Detailed description about the frame member 110, the disc driving motor 112, the pickup driving motor 116, the disc retaining member 120, the cam member 130, the disc holding members 140, the resilient member 150, the disc holding mechanism 160, the flange holding arm 162, the arm holding member 166, the optical pickup unit 170, the transmitting mechanism 172 and the screw rod 178 will therefore be omitted hereinafter.

The operation of the disc drive apparatus 200 will be described hereinafter with reference to the drawings shown in FIGS. 9 to 11.

The following description will be described to the case that the optical disc is mounted on the disc retaining member 120. In this case, the disc retaining member 120 is operated to assume the non-retaining state with each of the disc holding members 140 being moved to assume the disc releasing position before the optical disc is mounted on the disc retaining member 120.

The disc retaining member 120 is held in the non-retaining state in which the optical disc is dismounted from the disc retaining member 120 as shown in FIG. 9 until the optical disc is mounted on the disc retaining member 120.

When the optical disc, not shown, is mounted on the disc retaining member 120 with the disc retaining member 120 being operated to assume the disc retaining state, the disc detecting unit, not shown, is operated to detect the optical disc mounted on the disc retaining member 120.

When the disc detecting unit is operated to detect the optical disc mounted on the disc retaining member 120, the lever holding member 298 is moved by the driving motor, not shown, to assume the lever releasing position in which the holding end 299 of the lever holding member 298 is held out of contact with the rod 295 of the third end portion 293 of the driving lever 290 as shown in FIG. 10.

When the lever holding member 298 is moved by the driving motor to assume the lever releasing position, the driving lever 290 is moved by the resilient force of the lever urging member 297 to assume the second driving position as shown in FIG. 10.

When the driving lever 290 is moved by the resilient force of the lever urging member 297 to assume the second driving position, the cam rocking member 280 is moved by the driving lever 290 in a direction shown by an arrow 201a to assume the disengaging position in which the first end portion 281 of the cam rocking member 280 is held out of engagement with the cam member 130 as shown in FIG. 10. At this time, the cam rocking member 280 is simultaneously operated to assume the arm holding position in which the protrusion 283 of the cam rocking member 280 is held in contact with the flange holding arm 162 to have the flange holding arm 162 elastically deformed to assume the flange releasing state.

When the cam rocking member 280 is moved by the driving lever 290 to assume the disengaging position, the cam member 130 is rocked by the cam rocking member 280 in a direction shown by an arrow 202a to assume the first rocking position as shown in FIG. 10.

When the cam member 130 is rocked by the cam rocking member 280 to assume the first rocking position, each of the disc holding members 140 is moved by the cam member 130 to assume the disc holding position in which the holding end 141 of each of the disc holding members 140 is held in contact with the central portion of the optical disc to hold the optical disc to the disc retaining member 120 as shown in FIG. 10.

When each of the disc holding members 140 is moved by the cam member 130 to assume the disc holding position, the optical pickup unit 170 is operated to assume the movable state in which the optical pickup unit 170 is movable toward and away from the rotation axis of the disc retaining member 120 to record information to and reproduce information from the optical disc rotated by the disc driving motor 112.

The following description will be described to the case that the optical disc is dismounted from the disc retaining member 120. In this case, the disc retaining member 120 is operated to assume the disc retaining state with each of the disc holding members 140 being moved to assume the disc holding position before the optical disc is dismounted from the disc retaining member 120.

The disc retaining member 120 is held in the disc retaining state in which the optical disc, not shown, is mounted on the disc retaining member 120 as shown in FIG. 10 until the optical pickup unit 170 is operated to assume the standstill state.

When the optical pickup unit 170 is operated to assume the standstill state in which the optical pickup unit 170 is held at a standstill on the moving line of the optical pickup unit 170, the lever holding member 298 is moved by the driving motor, not shown, to assume the lever holding position in which the holding end 299 of the lever holding member 298 is held in contact with the rod 295 of the third end portion 293 of the driving lever 290 as shown in FIG. 9.

When the lever holding member 298 is moved by the driving motor to assume the lever holding position, the driving lever 290 is moved by the lever holding member 298 against the resilient force of the lever urging member 297 to assume the first driving position as shown in FIG. 9.

When the driving lever 290 is moved by the lever holding member 298 to assume the first driving position, the cam rocking member 280 is moved by the driving lever 290 in a direction shown by an arrow 201b to assume the engaging position in which the first end portion 281 of the cam rocking member 280 is held in engagement with the cam member 130 as shown in FIG. 9. At this time, the cam rocking member 280 is simultaneously operated to assume the arm releasing position in which the protrusion 283 of the cam rocking member 280 is held out of contact with the flange holding arm 162 to have the flange holding arm 162 elastically deformed to assume the flange holding state.

When the cam rocking member 280 is moved by the driving lever 290 to assume the engaging position, the cam member 130 is rocked by the cam rocking member 280 in a direction shown by an arrow 202b to assume the second rocking position as shown in FIG. 9.

When the cam member 130 is rocked by the cam rocking member 280 to assume the second rocking position, each of the disc holding members 140 is moved by the cam member 130 to assume the disc releasing position in which the holding end 141 of each of the disc holding members 140 is held out of contact with the central portion of the optical disc to release the optical disc from the disc retaining member 120 as shown in FIG. 9.

When each of the disc holding members 140 is moved by the cam member 130 to assume the disc releasing position, the optical disc is dismounted from the disc retaining member 120 with the disc retaining member 120 being operated to assume the non-retaining state as shown in FIG. 9.

The disc retaining member 120 is then held in the non-retaining state until the optical disc is mounted on the disc retaining member 120.

As will be seen from the foregoing description, the second embodiment of the disc drive apparatus according to the present invention makes it possible 1) to be reduced in number of the constitution parts, 2) to be simple in construction, and 3) to be inexpensive in production cost, resulting from the fact that the resilient member intervenes between the disc retaining member and each of the disc holding members.

The fact that the second groove portion of each of the grooves of the cam member is larger in space distance than the first groove portion of each of the grooves of the cam member leads to the fact that the cam member is entirely rocked to assume the first rocking position to have each of the disc holding members held in contact with the central portion of the optical disc. Accordingly, the second embodiment of the disc drive apparatus according to the present invention makes it possible 4) to be operated to have the optical disc mounted thereon with a sufficient holding force to hold the optical disc.

The fact that the driving lever is operated to drive the cam rocking member to be moved between the engaging position and the disengaging position leads to the fact that the optical pickup unit is increased in thrust force. Accordingly, the second embodiment of the disc drive apparatus according to the present invention makes it possible 5) to be operated to drive the optical pickup unit with a sufficient transport speed to record information to and reproduced information from the optical disc.

Figure 12:
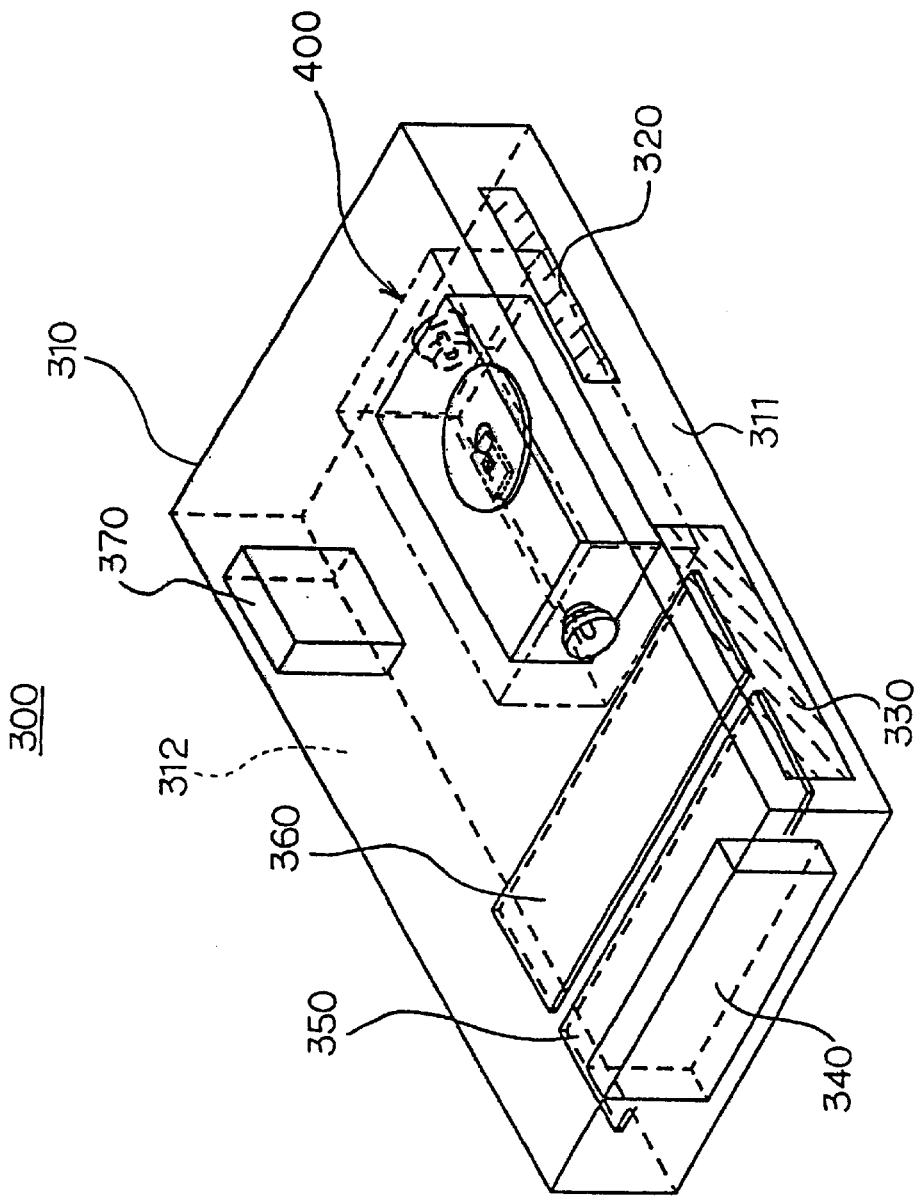
FIG. 12 is a perspective view showing a video recorder equipped with the disc drive apparatus according to the present invention.
Figure 13A:
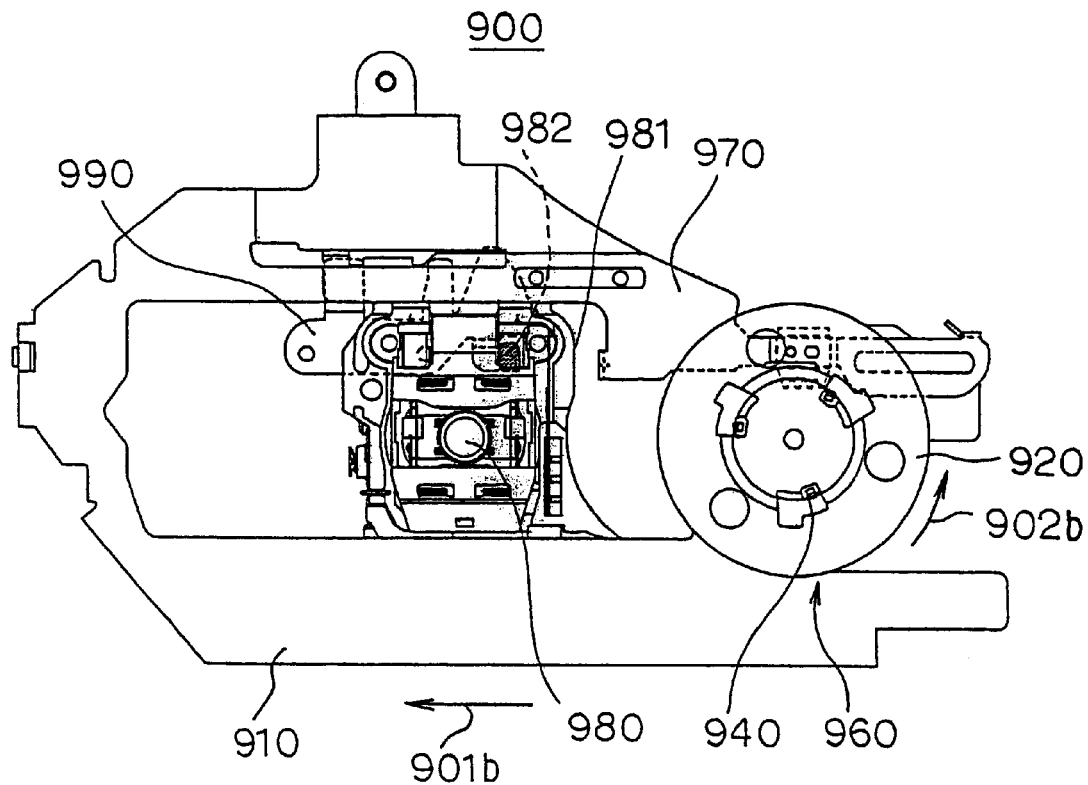
FIG. 13A is a plan view showing the conventional disc drive apparatus and showing an operation state in which an optical disc is dismounted from a disc retaining member forming part of the conventional disc drive apparatus.
Figure 13B:
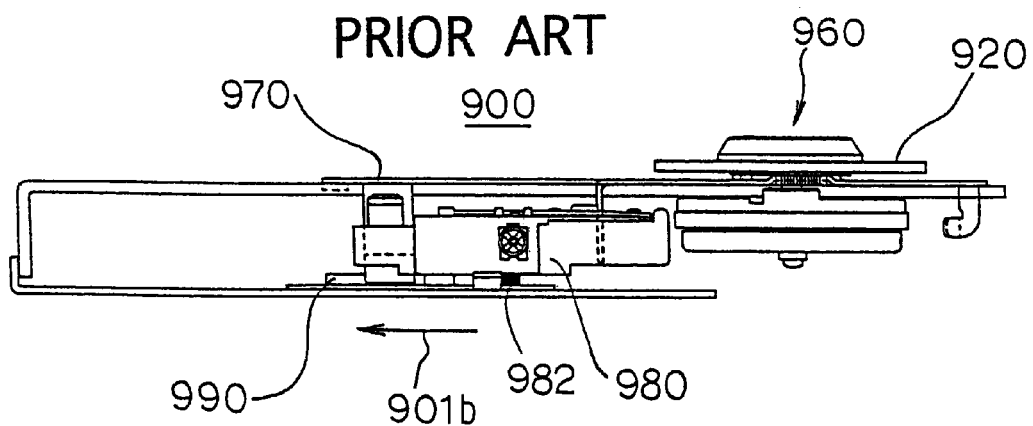
FIG. 13B is a side view showing the disc drive apparatus shown in FIG. 13A.
Figure 14A:
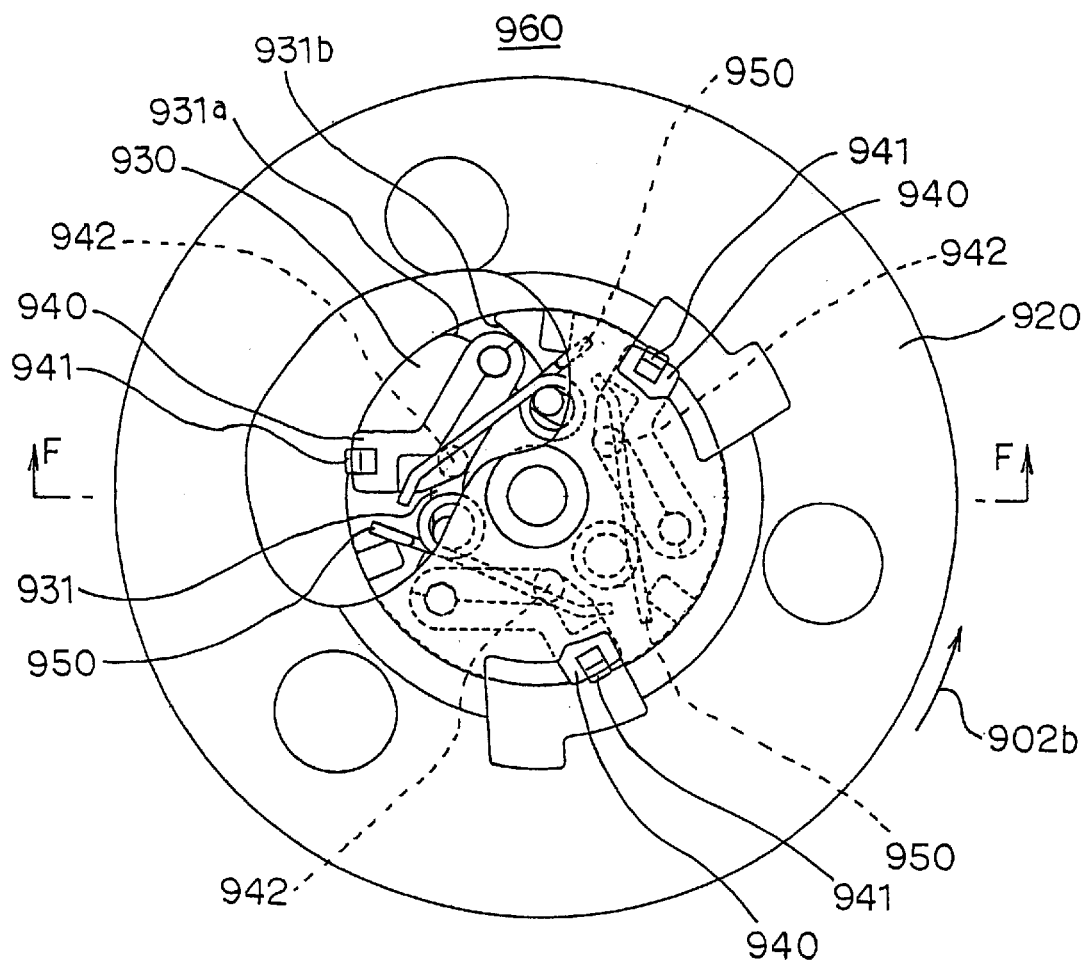
FIG. 14A is a fragmentary plan view showing a disc holding mechanism forming part of the conventional disc drive apparatus shown in FIG. 13A.
Figure 14B:
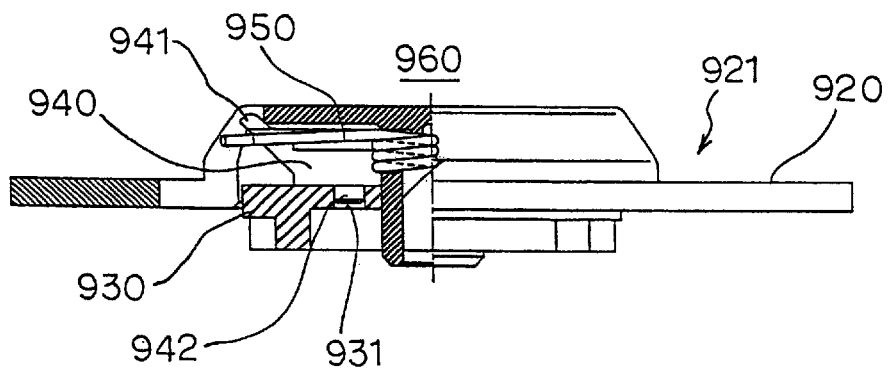
FIG. 14B is a fragmentary cross-sectional view taken along the lines F—F of FIG. 14A.
Figure 15A:
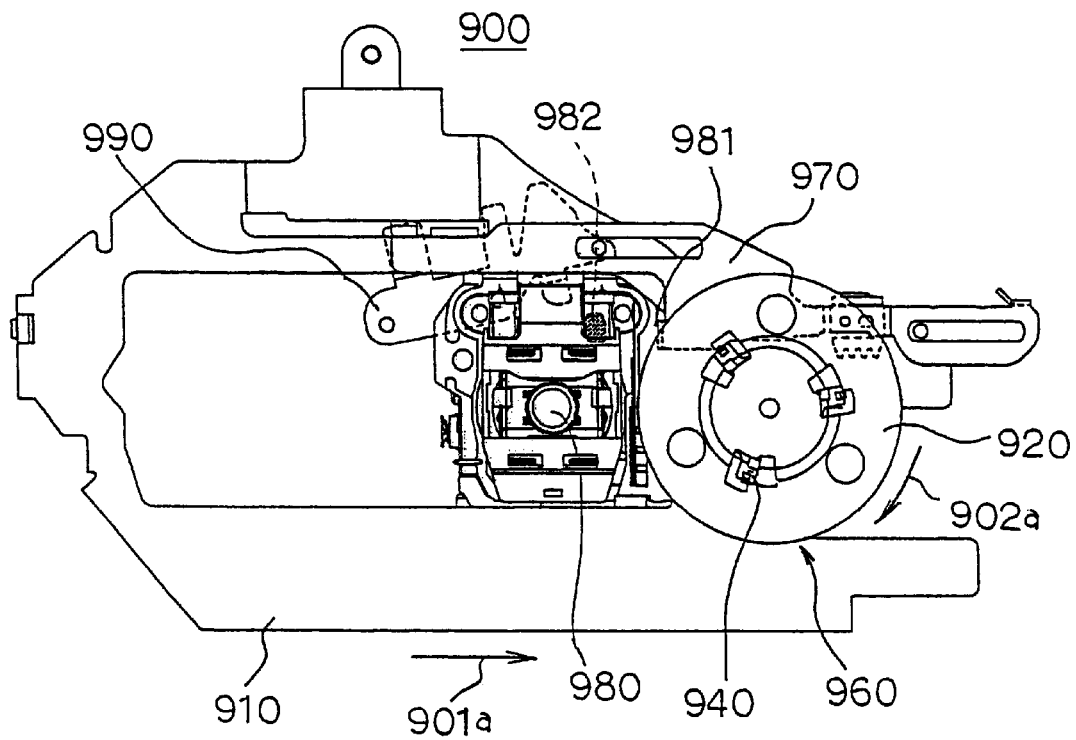
FIG. 15A is a plan view similar to FIG. 13A but showing an operation state in which an optical disc, not shown, is mounted on the disc retaining member forming part of the conventional disc drive apparatus shown in FIG. 13A.
Figure 15B:
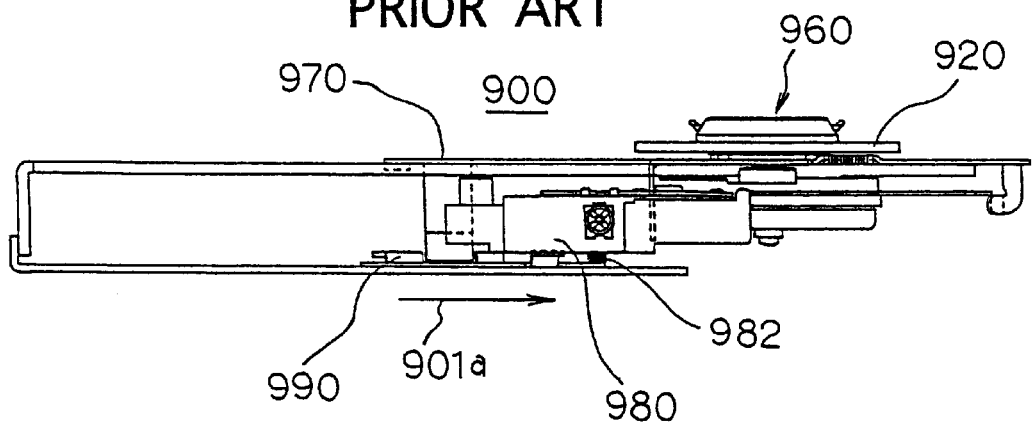
FIG. 15B is a side view showing the disc drive apparatus shown in FIG. 15A.
Figure 16A:
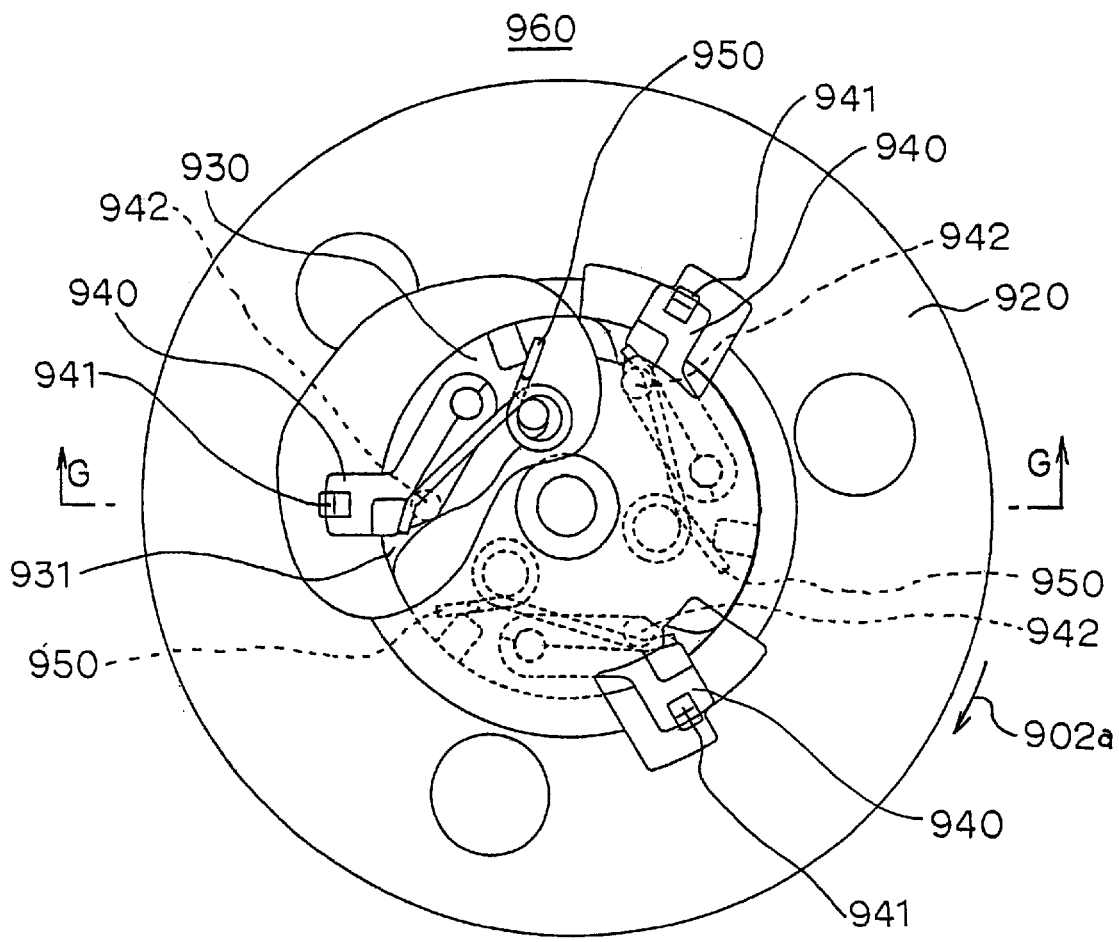
FIG. 16A is a fragmentary plan view showing the disc holding mechanism forming part of the conventional disc drive apparatus shown in FIG. 15A.
Figure 16B:
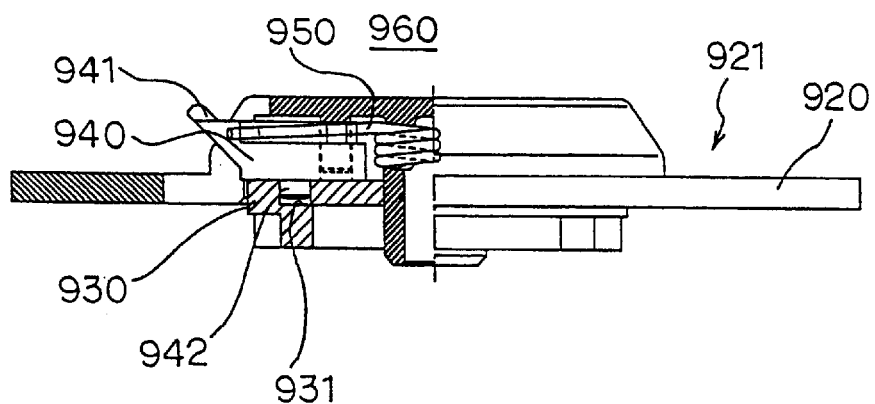
FIG. 16B is a fragmentary cross-sectional view taken along the lines G—G of FIG. 16A.

While each of the disc drive apparatuses 100 and 200 has been described in the above as shown in FIGS. 1 to 11, each of the disc drive apparatuses 100 and 200 may be available for a video recorder designed to record information to an optical disc according to the present invention. In FIG. 12, the video recorder 300 comprises a casing 310 having front and rear panels 311 and 312, a disc insertion/ejection unit 320 disposed on the front panel 311 of the casing 310, a display unit 330 disposed on the front panel 311 of the casing 310, a disc drive apparatus 400 accommodated in the casing 310 under the state that the disc drive apparatus 400 is integrally formed with or detachably supported by the casing 310, a power unit 340, a power board 350 operative to supply power to the components of the video recorder 300 in conjunction with the power unit 340, a circuit board 360 designed to control the operation of the video recorder 300, and a cooling fan 370 disposed on the rear panel 312 of the casing 310. The disc drive apparatus 400 is entirely the same as the disc drive apparatus 100 of the first embodiment or the disc drive apparatus 200 of the second embodiment. Detailed description about the disc drive apparatus 400 will therefore be omitted hereinafter.

It is understood the above-mentioned embodiment of the disc drive apparatuses according to the present invention has an advantage and effect the same as that of each of the first and second embodiments of the disc drive apparatus according to the present invention.

While the present invention has thus been shown and described with reference to the specific embodiments, however, it should be noted that the invention is not limited to the details of the illustrated structures but changes and modifications may be made without departing from the scope of the appended claims.

What is claimed is:

1. A disc drive apparatus for driving an optical disc having a central portion formed with a central hole, comprising:
    a frame member (110);
    a disc retaining member (120) rotatably supported by said frame member (110);
    a cam member (130) supported by said disc retaining member (120) and rockable with respect to said disc retaining member (120) to assume two different operation positions including first and second rocking positions;
    a plurality of disc holding members (140) each supported by said disc retaining member (120) and operatively coupled with said cam member (130), each of said disc holding members (140) being movable with respect to said disc retaining member (120) to assume two different operation positions including a disc holding position in which each of said disc holding members (140) is held in contact with said central portion of said optical disc under the state that said cam member (130) is rocked to assume said first rocking position, and a disc releasing position in which each of said disc holding members (140) is held out of contact with said central portion of said optical disc under the state that said cam member (130) is rocked to assume said second rocking position;
    a resilient member (150) intervening between said disc retaining member (120) and each of said disc holding members (140) to have each of said disc holding members (140) resiliently urged to assume said disc holding position, wherein said resilient member (150) has a center axis and is supported by said disc retaining member (120) under the state that said center axis of said resilient member (150) is held in coaxial relationship with said rotation axis of said disc retaining member (120), said cam member (130) is formed with a plurality of grooves (133) each having first and second groove portions (134 and 135), said second groove portion (135) of each of said grooves (133) of said cam member (130) being larger in space distance than said first groove portion (134) of each of said grooves (133) of said cam member (130), and in which each of said disc holding members (140) has a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position.

2. A disc drive apparatus for driving an optical disc having a central portion formed with a central hole, comprising:
    a frame member (110);
    a disc retaining member (120) rotatably supported by said frame member (110);
    a cam member (130) supported by said disc retaining member (120) and rockable with respect to said disc retaining member (120) to assume two different operation positions including first and second rocking positions;
    a plurality of disc holding members (140) each supported by said disc retaining member (120) and operatively coupled with said cam member (130), each of said disc holding members (140) being movable with respect to said disc retaining member (120) to assume two different operation positions including a disc holding position in which each of said disc holding members (140) is held in contact with said central portion of said optical disc under the state that said cam member (130) is rocked to assume said first rocking position, and a disc releasing position in which each of said disc holding members (140) is held out of contact with said central portion of said optical disc under the state that said cam member (130) is rocked to assume said second rocking position;
    a resilient member (150) intervening between said disc retaining member (120) and each of said disc holding members (140) to have each of said disc holding members (140) resiliently urged to assume said disc holding position;
    an optical pickup unit (170) movably supported by said frame member (110);
    a pickup driving means (116) for driving said optical pickup unit (170);
    a cam rocking member (180) supported by said frame member (110) and movable with respect to said frame member (110) to assume two different operation positions including an engaging position in which said cam rocking member (180) is held in engagement with said cam member (130) to have said cam member (130) rocked to assume said second rocking position, and a disengaging position in which said cam rocking member (180) is held out of engagement with said cam member (130) to have said cam member (130) rocked to assume said first rocking position; and
    a changeover mechanism (190) intervening between said pickup driving means (116) and said cam rocking member (180) and operative to assume two different operation states including a connecting state in which said pickup driving means (116) is operatively connected to said cam rocking member (180) through said changeover mechanism (190) to have said cam rocking member (180) moved between said engaging position and said disengaging position, and a disconnecting state in which said pickup driving means (116) is disconnected from said cam rocking member (180).

3. A disc drive apparatus for driving an optical disc having a central portion formed with a central hole, comprising:
    a frame member (110);

a disc retaining member (120) rotatably supported by said frame member (110);

a cam member (130) supported by said disc retaining member (120) and rockable with respect to said disc retaining member (120) to assume two different operation positions including first and second rocking positions;

a plurality of disc holding members (140) each supported by said disc retaining member (120) and operatively coupled with said cam member (130), each of said disc holding members (140) being movable with respect to said disc retaining member (120) to assume two different operation positions including a disc holding position in which each of said disc holding members (140) is held in contact with said central portion of said optical disc under the state that said cam member (130) is rocked to assume said first rocking position, and a disc releasing position in which each of said disc holding members (140) is held out of contact with said central portion of said optical disc under the state that said cam member (130) is rocked to assume said second rocking position;

a resilient member (150) intervening between said disc retaining member (120) and each of said disc holding members (140) to have each of said disc holding members (140) resiliently urged to assume said disc holding position;

a cam rocking member (280) supported by said frame member (110) and movable with respect to said frame member (110) to assume two different operation positions including an engaging position in which said cam rocking member (280) is held in engagement with said cam member (130) to have said cam member (130) rocked to assume said second rocking position, and a disengaging position in which said cam rocking member (280) is held out of engagement with said cam member (130) to have said cam member (130) rocked to assume said first rocking position;

a driving lever (290) supported by said frame member (110) and operatively connected to said cam rocking member (280), said driving lever (290) being movable with respect to said frame member (110) to assume two different operation positions including a first driving position in which said driving lever (290) is operative to drive said cam rocking member (280) to be moved to assume said engaging position, and a second driving position in which said driving lever (290) is operative to drive said cam rocking member (280) to be moved to assume said disengaging position; and a lever urging means (297) for urging said driving lever (290) to assume said second driving position.

4. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130), wherein said grooves (133) of said cam member (130) are disposed around said rock axis of said cam member (130) in equiangularly spaced relationship with each other;

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position;

a resilient member (150) intervening between said disc retaining member (120) and each of said disc holding members (140) to have each of said disc holding members (140) resiliently urged to assume said disc holding position, wherein said resilient member (150) has a center axis and is supported by said disc retaining member (120) under the state that said center axis of said resilient member (150) is held in coaxial relationship with said rotation axis of said disc retaining member (120).

5. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position, wherein each of said grooves (133) of said cam member (130) has opposing side surfaces (133a and 133b) each held in parallel relationship with said rock axis of said cam member (130), each of said grooves (133) of said cam member (130) having a center plane located between said opposing side surfaces (133a and 133b) of each of said grooves (133) of said cam member (130) in equidistantly spaced relationship with said opposing side surfaces (133a and 133b) of each of said grooves (133) of said cam member (130), and a perpendicular line held in perpendicular relationship to said center plane of each of said grooves (133) of said cam member (130), said opposing side surfaces (133a and 133b) of each of said grooves (133) of said cam member(130) opposing and spaced apart along said perpendicular line of each of said grooves (133) of said cam member (130) from each other at a predetermined space distance; and, a resilient member (150) intervening between said disc retaining member (120) and each of said disc holding members (140) to have each of said disc holding members (140) resiliently urged to assume said disc holding position.

6. A disc drive apparatus as set forth in claim 5, in which said second groove portion (135) of each of said grooves (133) of said cam member (130) is larger in space distance than said first groove portion (134) of each of said grooves (133) of said cam member (130).

7. A disc drive apparatus as set forth in claim 5, in which said projection (142) of each of said disc holding members (140) is slidably movable along said opposing side surfaces (133a and 133b) of each of said grooves (133) of said cam member (130).

8. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position; and a resilient member (150) intervening between said disc retaining member (120) and each of said disc holding members (140) to have each of said disc holding members (140) resiliently urged to assume said disc holding position, wherein each of said disc holding members (140) is swingable around said projection (142) in parallel relationship with said rotation axis of said disc retaining member (120) with each of said disc holding members (140) being movable between said disc holding position and said disc releasing position.

9. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position; and a resilient member (150) intervening between said disc retaining member (120) and each of said disc holding members (140) to have each of said disc holding members (140) resiliently urged to assume said disc holding position, wherein said resilient member (150) has a center axis and is supported by said disc retaining member (120) under the state that said center axis of said resilient member (150) is held in coaxial relationship with said rotation axis of said disc retaining member (120).

10. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position; and a resilient member (150) intervening between said disc retaining member (120) and each of said disc holding members (140) to have each of said disc holding members (140) resiliently urged to assume said disc holding position, wherein said resilient member (150) has a base portion (151) in the form of a disc shape, and a plurality of arm portions (152) each integrally formed with said base portion (151) of said resilient member (150) and radially outwardly extending from said base portion (151) of said resilient member (150).

11. A disc drive apparatus as set forth in claim 10, in which said base portion (151) of said resilient member (150) is formed with a through bore (153) and securely supported by said disc retaining member (120) under the state that said shaft portion (121) of said disc retaining member (120) is received in said through bore (153) of said base portion (151) of said resilient member (150).

12. A disc drive apparatus as set forth in claim 10, in which each of said arm portions (152) of said resilient member (150) is in the form of a strip shape.

13. A disc drive apparatus as set forth in claim 10, in which each of said arm portions (152) of said resilient member (150) has a fixed end (154) connected to said base portion (151) of said resilient member (150), and a free end (155) held in contact with each of said disc holding members (140).

14. A disc drive apparatus as set forth in claim 13, in which said free end (155) of each of said arm portions (152) of said resilient member (150) is in the form of a cranked shape.

15. A disc drive apparatus as set forth in claim 10, which said arm portions (152) of said resilient member (150) are disposed around said rotation axis of said disc retaining member (120) in equiangularly spaced relationship with each other.

16. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position;

a resilient member (150) intervening between said disc retaining member (120) and each of said disc holding members (140) to have each of said disc holding members (140) resiliently urged to assume said disc holding position;

a flange holding arm (162) supported by said frame member (110) and having a fixed end (163) connected to said frame member (110); and a free end (164) spaced apart from said frame member (110), said flange holding arm (162) being elastically deformable to assume two different operation states including a flange holding state in which said free end (164) of said flange holding arm (162) is held in engagement with said disc retaining member (120) to have said disc retaining member (120) fixedly supported by said frame member (110) through said flange holding arm (162), and a flange releasing state in which said free end (164) of said flange holding arm (162) is held out of engagement with said disc retaining member (120) to have said disc retaining member (120) rotatably supported by said frame member (110).

17. A disc drive apparatus as set forth in claim 16, which further comprises an arm holding member (166) supported by said frame member (110) and movable with respect to said frame member (110) to assume two different operation positions including an arm holding position in which said arm holding member (166) is held in contact with said flange holding arm (162) to have said flange holding arm (162) elastically deformed to assume said flange releasing state, and an arm releasing position in which said arm holding member (166) is held out of contact with said flange holding arm (162) to have said flange holding arm (162) elastically deformed to assume said flange holding state.

18. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position;

a resilient member (150) intervening between said disc retaining member (120) and each of said disc holding members (140) to have each of said disc holding members (140) resiliently urged to assume said disc holding position;

an optical pickup unit (170) having a moving line held in perpendicular relationship to said rotation axis of said disc retaining member (120), said optical pickup unit (170) being supported by said frame member (110) and movable toward and away from said rotation axis of said disc retaining member (120) along said moving line of said optical pickup unit (170), a pickup driving motor (116) for driving said optical pickup unit (170) to be movable toward and away from said rotation axis of said disc retaining member (120) along said moving line of said optical pickup unit (170);

a cam rocking member (180) supported by said frame member (110) and movable with respect to said frame member (110) to assume two different operation positions including an engaging position in which said cam rocking member (180) is held in engagement with said cam member (130) to have said cam member (130) rocked to assume said second rocking position, and a disengaging position in which said cam rocking member (180) is held out of engagement with said cam member (130) to have said cam member (130) rocked to assume said first rocking position; and a changeover mechanism (190) intervening between said pickup driving motor (116) and said cam rocking member (180) and operative to assume two different operation states including a connecting state in which said pickup driving motor (116) is operatively connected to said cam rocking member (180) through said changeover mechanism (190) to have said cam rocking member (180) moved between said engaging position and said disengaging position, and a disconnecting state in which said pickup driving motor (116) is disconnected from said cam rocking member (180).

19. A disc drive apparatus as set forth in claim 18, in which said optical pickup unit (170) is operative to record information to said optical disc.

20. A disc drive apparatus as set forth in claim 18, in which said optical pickup unit (170) is operative to reproduce information from said optical disc.

21. A disc drive apparatus as set forth in claim 18, in which said cam rocking member (180) has a moving line held in parallel relationship with said moving line of said optical pickup unit (170), said cam rocking member (180) being movable between said engaging position and said disengaging position along said moving line of said cam rocking member (180).

22. A disc drive apparatus as set forth in claim 18, in which said changeover mechanism (190) includes a changeover gear (191) supported by said frame member (110) and rotatable around its rotation axis.

23. A disc drive apparatus as set forth in claim 22, in which said rotation axis of said changeover gear (191) of said changeover mechanism (190) is held in parallel relationship with said moving line of said optical pickup unit (170).

24. A disc drive apparatus as set forth in claim 22, in which said changeover gear (191) of said changeover mechanism (190) is axially movable along said rotation axis of said changeover gear (191) of said changeover mechanism (190) to assume two different operation positions including a connecting position in which the rotation of said pickup driving motor (116) is transmitted to said cam rocking member (180) through said changeover gear (191) of said changeover mechanism (190) under the state that said changeover mechanism (190) is operated to assume said connecting state, and a disconnecting position in which said pickup driving motor (116) is disconnected from said cam rocking member (180) under the state that said changeover mechanism (190) is operated to assume said disconnecting state.

25. A disc drive apparatus as set forth in claim 24, which further comprises a gear urging member (197) intervening between said frame member (110) and said changeover gear (191) of said changeover mechanism (190) to have said changeover gear (191) of said changeover mechanism (190) resiliently urged to assume said disconnecting position.

26. A disc drive apparatus as set forth in claim 24, which further comprises a gear holding member (198) having a holding end (199) and being movable with respect to said frame member (110) to assume two different operation positions including a gear holding position in which said holding end (199) of said gear holding member (198) is held in contact with said changeover gear (191) of said changeover mechanism (190) to have said changeover gear (191) of said changeover mechanism (190) axially moved to assume said connecting position, and a gear releasing position in which said holding end (199) of said gear holding member (198) is held out of contact with said changeover gear (191) of said changeover mechanism (190) to have said changeover gear (191) of said changeover mechanism (190) axially moved to assume said disconnecting position.

27. A disc drive apparatus as set forth in claim 18, which further comprises a transmitting mechanism (172) intervening between said pickup driving motor (116) and said optical pickup unit (170) to have said pickup driving motor (116) operatively connected to said optical pickup unit (170) through said transmitting mechanism (172) with said optical pickup unit (170) being movable toward and away from said rotation axis of said disc retaining member (120) along said moving line of said optical pickup unit (170), said transmitting mechanism (172) including a plurality of transmitting gears (173 to 176) intervening between said pickup driving motor (116) and said optical pickup unit (170) to transmit the rotation of said pickup driving motor (116) to said optical pickup unit (170), and in which said changeover mechanism (190) is constituted by one of said transmitting gears (173 to 176) of said transmitting mechanism (172).

28. A disc drive apparatus for driving an optical disc having a central portion formed with a central hole, comprising:

a frame member (110);

a disc retaining member (120) supported by said frame member (110) and rotatable around its rotation axis, said disc retaining member (120) having a shaft portion (121) in the form of a cylindrical shape, and a retaining portion (122) integrally formed with said shaft portion (121) of said disc retaining member (120) and radially outwardly extending from said shaft portion (121) of said disc retaining member (120);

a cam member (130) having a rock axis held in coaxial relationship with said rotation axis of said disc retaining member (120), said cam member (130) being supported by said disc retaining member (120) and rockable around said rock axis of said cam member (130) to assume two different operation positions including first and second rocking positions, said cam member (130) being formed with a plurality of grooves (133) each having a first groove portion (134) close to said rock axis of said cam member (130), and a second groove portion (135) remote from said rock axis of said cam member (130);

a plurality of disc holding members (140) each supported by said disc retaining member (120) and operatively coupled with said cam member (130), each of said disc holding members (140) having a holding end (141) and being movable with respect to said disc retaining member (120) to assume two different operation positions including a disc holding position in which said holding end (141) of each of said disc holding members (140) is held in contact with said central portion of said optical disc under the state that said cam member (130) is rocked to assume said first rocking position, and a disc releasing position in which said holding end (141) of each of said disc holding members (140) is held out of contact with said central portion of said optical disc under the state that said cam member (130) is rocked to assume said second rocking position, each of said disc holding members (140) having a projection (142) slidably movably received in each of said grooves (133) of said cam member (130) to assume two different operation positions including a first groove position in which said projection (142) of each of said disc holding members (140) is located in said first groove portion (134) of each of said grooves (133) of said cam member (130) under the state that each of said disc holding members (140) is moved to assume said disc releasing position, and a second groove position in which said projection (142) of each of said disc holding members (140) is located in said second groove portion (135) of each of said grooves (133) of said cam member (130) under the state that each of said disc holding members (140) is moved to assume said disc holding position;

a resilient member (150) intervening between said disc retaining member (120) and each of said disc holding members (140) to have each of said disc holding members (140) resiliently urged to assume said disc holding position;

a cam rocking member (280) supported by said frame member (110) and movable with respect to said frame member (110) to assume two different operation positions including an engaging position in which said cam rocking member (280) is held in engagement with said cam member (130) to have said cam member (130) rocked to assume said second rocking position, and a disengaging position in which said cam rocking member (280) is held out of engagement with said cam member (130) to have said cam member (130) rocked to assume said first rocking position, a driving lever (290) supported by said frame member (110) and operatively connected to said cam rocking member (280), said driving lever (290) being movable with respect to said frame member (110) to assume two different operation positions including a first driving position in which said driving lever (290) is operative to drive said cam rocking member (280) to be moved to assume said engaging position, and a second driving position in which said driving lever (290) is operative to drive said cam rocking member (280) to be moved to assume disengaging position, and a lever urging member (297) intervening between said frame member (110) and said driving lever (290) to have said driving lever (290) resiliently urged to assume said second driving position.

29. A disc drive apparatus as set forth in claim 28, which further comprises an optical pickup unit (170) having a moving line held in perpendicular relationship to said rotation axis of said disc retaining member (120), said optical pickup unit (170) being supported by said frame member (110) and movable toward and away from said rotation axis of said disc retaining member (120) along said moving line of said optical pickup unit (170), said optical pickup unit (170) being operative to record information to said optical disc.

30. A disc drive apparatus as set forth in claim 28, which further comprises an optical pickup unit (170) having a moving line held in perpendicular relationship to said rotation axis of said disc retaining member (120), said optical pickup unit (170) being supported by said frame member (110) and movable toward and away from said rotation axis of said disc retaining member (120) along said moving line of said optical pickup unit (170), said optical pickup unit (170) being operative to reproduce information from said optical disc.

31. A disc drive apparatus as set forth in claim 28, which further comprises an optical pickup unit (170) having a moving line held in perpendicular relationship to said rotation axis of said disc retaining member (120), said optical pickup unit (170) being supported by said frame member (110) and movable toward and away from said rotation axis of said disc retaining member (120) along said moving line of said optical pickup unit (170), and in which said cam rocking member (280) has a moving line held in parallel relationship with said moving line of said optical pickup unit (170) and is movable between said engaging position and said disengaging position along said moving line of said cam rocking member (280).

32. A disc drive apparatus as set forth in claim 28, in which said driving lever (290) having a pivot axis held in parallel relationship with said rotation axis of said disc retaining member (120), said driving lever (290) being pivotable around said pivot axis of said driving lever (290) with said driving lever (290) being movable between said first and second driving position.

33. A disc drive apparatus as set forth in claim 28, which further comprises a lever holding member (298) having a holding end (299) and being movable with respect to said frame member (110) to assume two different operation positions including a lever holding position in which said holding end (299) of said lever holding member (298) is held in contact with said driving lever (290) to have said driving lever (290) moved to assume said first driving position, and a lever releasing position in which said holding end (299) of said lever holding member (298) is held out of contact with said driving lever (290) to have said driving lever (290) moved to assume said second driving position.

* * * * *